United States Patent
Lee et al.

(10) Patent No.: US 11,296,558 B2
(45) Date of Patent: Apr. 5, 2022

(54) WIRELESS POWER TRANSMISSION APPARATUS

(71) Applicant: LG ELECTRONICS INC., Seoul (KR)

(72) Inventors: Jihyun Lee, Seoul (KR); Seonghun Lee, Seoul (KR); Bongsik Kwak, Seoul (KR); Joonho Park, Seoul (KR); Sungkyu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 317 days.

(21) Appl. No.: 16/687,325

(22) Filed: Nov. 18, 2019

(65) Prior Publication Data
US 2020/0204005 A1 Jun. 25, 2020

(30) Foreign Application Priority Data
Nov. 19, 2018 (KR) .......................... 10-2018-0142208

(51) Int. Cl.
*H02J 50/60* (2016.01)
*H02J 50/80* (2016.01)
(Continued)

(52) U.S. Cl.
CPC .............. *H02J 50/60* (2016.02); *G01V 3/104* (2013.01); *H01F 38/14* (2013.01); *H02J 7/025* (2013.01); *H02J 50/12* (2016.02); *H02J 50/80* (2016.02)

(58) Field of Classification Search
CPC .. H02J 50/60; H02J 7/025; H02J 50/12; H02J 50/80; H02J 50/402; H02J 50/70;
(Continued)

(56) References Cited

U.S. PATENT DOCUMENTS

| 2013/0027078 | A1* | 1/2013 | Nakano | ................... | H02J 7/025 |
| | | | | | 324/764.01 |
| 2014/0125287 | A1* | 5/2014 | Nakano | ................... | H01F 38/14 |
| | | | | | 320/128 |

(Continued)

FOREIGN PATENT DOCUMENTS

| KR | 10-2018-0022513 A | 3/2018 |
| KR | 10-2018-0064741 A | 6/2018 |
| KR | 20180064741 A * | 6/2018 |

*Primary Examiner* — Pinping Sun
(74) *Attorney, Agent, or Firm* — Birch, Stewart, Kolasch & Birch, LLP

(57) ABSTRACT

A wireless power transmission apparatus can include a resonant circuit including a plurality of coils and a plurality of capacitor elements respectively connected to the plurality of coils; a first sensor configured to sense a change in inductance of each of the plurality of coils; a second sensor configured to sense a change in a quality factor of each of the plurality of coils; and a controller configured to calculate feature values based on an inductance variation and a quality factor variation for detecting a foreign object, and determine the foreign object is present on a charging surface of the wireless power transmission apparatus based on whether a feature value combination selected from among the feature values falls within a reference region on a coordinate plane formed by an intersection of a first axis and a second axis, in which the first axis is based on inductance variation and the second axis is based on quality factor variation.

20 Claims, 14 Drawing Sheets

(51) Int. Cl.
 *H02J 50/12* (2016.01)
 *G01V 3/10* (2006.01)
 *H01F 38/14* (2006.01)
 *H02J 7/02* (2016.01)

(58) Field of Classification Search
 CPC ..... G01V 3/104; H01F 38/14; G01R 27/2611;
 G01R 27/2688
 See application file for complete search history.

(56) References Cited

U.S. PATENT DOCUMENTS

2015/0276965 A1* 10/2015 Turki ................. B60L 3/00
 324/207.17
2016/0164302 A1* 6/2016 Nakano ............... H02J 5/005
 307/104
2017/0117756 A1 4/2017 Muratov
2017/0179772 A1* 6/2017 Asanuma ........... H02J 7/00034
2018/0248408 A1* 8/2018 Chen ................. H02J 50/05
2019/0074730 A1* 3/2019 Shahsavari ........ G01R 27/2688
2019/0379243 A1* 12/2019 Park ................... G01N 27/02

\* cited by examiner

WIRELESS POWER TRANSMISSION APPARATUS

CROSS-REFERENCE TO RELATED APPLICATION

This application claims the priority benefit of Korean Patent Application No. 10-2018-0142208, filed on Nov. 19, 2018, in the Korean Intellectual Property Office, the entirety of which is incorporated herein by reference.

BACKGROUND OF THE INVENTION

1. Field of the Invention

The present disclosure relates to a wireless power transmission apparatus, and more particularly to a wireless power apparatus capable of easily detecting a foreign object on a charging surface.

2. Description of the Related Art

As a method of supplying power to an electronic device, there is a terminal supply method of interconnecting a commercial power source and an electronic device using physical cables or wires. However, the terminal supply method has problems in that the cables or wires occupy a large space, are difficult to arrange, and entail the risk of disconnection.

In order to solve these problems, studies have recently been conducted to develop a wireless power transmission method.

A wireless power transmission system may include a wireless power transmission apparatus for supplying power through a single coil or multiple coils, and a wireless power reception apparatus for receiving and using the power wirelessly supplied from the wireless power transmission apparatus.

An inductive coupling method is mainly used as a wireless power supply method. The inductive coupling method uses a principle in which when the intensity of current flowing through a primary coil of two adjacent coils is changed, a magnetic field is changed by the current, a magnetic flux flowing through a secondary coil is changed, and an induced electromotive force is generated at the secondary coil. That is, according to this method, it is possible to generate an induced electromotive force by changing only current flowing through the primary coil in the state in which two coils are spaced apart from each other without moving two conducting wires.

However, the inductive coupling method, which has non-contact charging characteristics, has problems in that when a foreign object is present between a wireless power transmission apparatus and a wireless power reception apparatus during charging, overload, burning or explosion of a product may occur due to deterioration attributable to the foreign object.

Therefore, there is the need to develop a method of more easily detecting a foreign object on a charging surface of a wireless power transmission apparatus.

"Wireless Power System" disclosed in U.S. Pat. No. 9,825,486 B2 suggests a method of detecting a foreign object through voltage oscillation of a resonant tank including a detection coil and a capacitor.

However, the "Wireless Power System" described above requires a separate detection coil for detecting a foreign object in addition to a power transmission coil. Thus, manufacturing costs increase, and a circuit becomes complicated.

"Wireless Charging Apparatus" disclosed in Korean Patent Laid-open Publication No. 10-2018-0065693 proposes a method of detecting a foreign object by comparing the current peak frequency and the foreign object detection reference frequency.

However, like the "Wireless Charging Apparatus" described above, the one-dimensional foreign object detection method using only a peak frequency without comprehensive consideration of inductance variation, quality factor variation, and the like may cause an error in detecting a foreign object. In particular, the "Wireless Charging Apparatus" described above is characterized by a single coil and proposes a method of solving a problem in that the peak frequency varies depending on the location of a power reception apparatus Rx by adding a predetermined allowable error value to the maximum peak frequency variation. However, the addition of the error value may further deteriorate accuracy of detection of a foreign object.

SUMMARY OF THE INVENTION

Therefore, the present disclosure has been made in view of the above problems, and it is an object of the present disclosure to provide a wireless power transmission apparatus capable of more accurately detecting a foreign object on a charging surface using multiple coils disposed to partially overlap each other.

It is another object of the present disclosure to provide a wireless power transmission apparatus capable of more easily detecting a foreign object within a wide range on a charging surface using multiple coils disposed to partially overlap each other.

It is still another object of the present disclosure to provide a wireless power transmission apparatus enabling two-dimensional foreign object detection by displaying a plurality of feature values extracted from inductance variation and quality factor variation on a coordinate plane.

It is still another object of the present disclosure to provide a wireless power transmission apparatus capable of detecting a foreign object on a charging surface without a separate module.

However, the objects to be accomplished by the disclosure are not limited to the above-mentioned objects, and other objects not mentioned herein will be clearly understood by those skilled in the art from the following description.

In accordance with the present disclosure, the above and other objects can be accomplished by the provision of a wireless power transmission apparatus including a resonant circuit including a plurality of coils and a plurality of capacitor elements respectively connected to the coils, a first sensor configured to sense a change in inductance of each of the coils, a second sensor configured to sense a change in a quality factor of each of the coils, and a controller configured to calculate a plurality of feature values to detect a foreign object based on an inductance variation and a quality factor variation and configured to determine whether a foreign object is present on a charging surface based on whether a feature value combination selected from the feature values falls within a reference region on a coordinate plane.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE EMBODIMENTS

Reference will now be made in detail to the preferred embodiments of the present disclosure, examples of which are illustrated in the accompanying drawings.

As used herein, the suffixes "module" and "unit" are added or interchangeably used to facilitate preparation of this specification and are not intended to suggest unique meanings or functions.

Terms including ordinal numbers such as first, second, etc. may be used to explain various elements. However, it will be appreciated that the elements are not limited to such terms. These terms are merely used to distinguish one element from another.

It will be further understood that terms such as "include" or "have," when used in this specification, specify the presence of stated features, integers, steps, operations, elements, components, or combinations thereof, but do not preclude the presence or addition of one or more other features, integers, steps, operations, elements, components, or combinations thereof.

Figure 1:
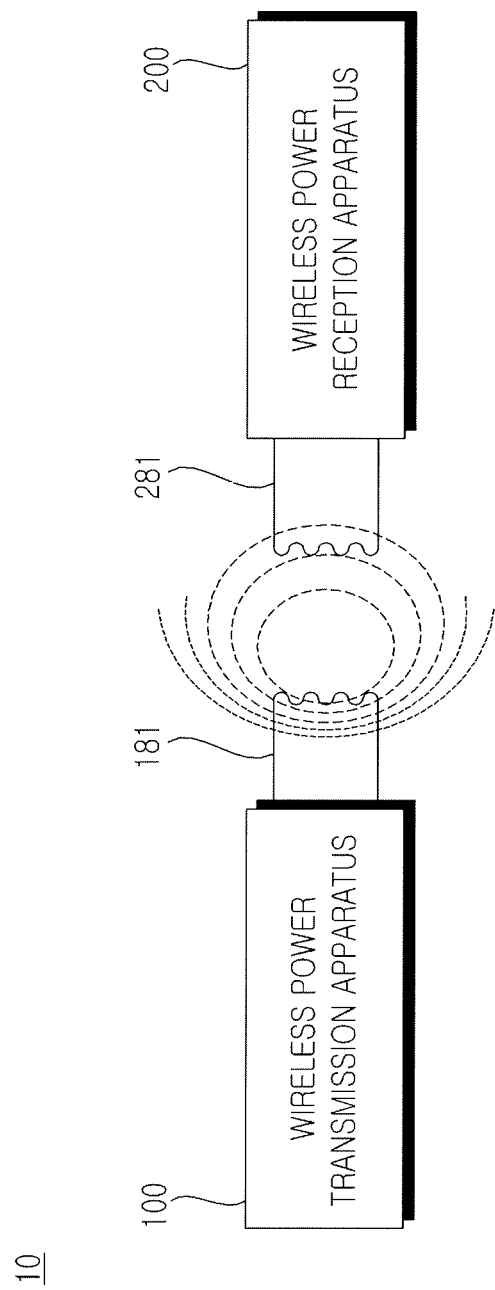
FIG. 1 is a block diagram of the internal configuration of a wireless power system according to an embodiment of the present disclosure.

FIG. 1 is an example block diagram of the internal configuration of a wireless power system according to an embodiment of the present disclosure.

Referring to the drawing, a wireless power system 10 may include a wireless power transmission apparatus 100, which wirelessly transmits power, and a wireless power reception apparatus 200, which receives the wirelessly transmitted power.

The wireless power transmission apparatus 100 may transmit power to the wireless power reception apparatus 200 using a magnetic induction phenomenon in which current is induced to a reception coil 281 by changing a magnetic field of a coil 181. In this situation, the wireless power transmission apparatus 100 and the wireless power reception apparatus 200 may perform wireless charging using an electromagnetic induction scheme defined by the Wireless Power Consortium (WPC) or the Power Matters Alliance (PMA). Alternatively, the wireless power transmission apparatus 100 and the wireless power reception apparatus 200 may perform wireless charging using a magnetic resonance scheme defined by the Alliance for Wireless Power (A4WP).

The wireless power transmission apparatus 100 may wirelessly transmit power to the wireless power reception apparatus 200 to charge the same.

In one example, a single wireless power transmission apparatus 100 may charge a plurality of wireless power reception apparatuses 200. In this situation, the wireless power transmission apparatus 100 may distribute and transmit power to the plurality of wireless power reception apparatuses 200 in a time division manner. However, the present disclosure is not limited thereto. In another example, the wireless power transmission apparatus 100 may distribute and transmit power to a plurality of wireless power reception apparatuses 200 using different frequency bands allocated to the respective wireless power reception apparatuses 200. The number of wireless power reception apparatuses 200 capable of being connected to one wireless power transmission apparatus 100 may be adaptively determined based on the amount of power that is required for each wireless power reception apparatus 200, the amount of power available to the wireless power transmission apparatus 100, and the like.

In still another example, a plurality of wireless power transmission apparatuses 100 may charge at least one wireless power reception apparatus 200. In this situation, the at least one wireless power reception apparatus 200 may be simultaneously connected to the plurality of wireless power transmission apparatuses 100, and may be charged by simultaneously receiving power from the wireless power transmission apparatuses 100 connected thereto. The number of wireless power transmission apparatuses 100 may be adaptively determined based on the amount of power that is required for each wireless power reception apparatus 200, the amount of power available to each of the wireless power transmission apparatuses 100, and the like.

The wireless power reception apparatus 200 may receive power transmitted from the wireless power transmission apparatus 100.

For example, the wireless power reception apparatus 200 may be a mobile phone, a laptop computer, a wearable device such a smart watch, a personal digital assistant (PDA), a portable multimedia player (PMP), a navigation device, an MP3 player, an electric toothbrush, a lighting device, and a remote control. However, the present disclosure is not limited thereto. The wireless power reception apparatus may be any electronic device having a rechargeable battery.

The wireless power transmission apparatus 100 and the wireless power reception apparatus 200 may perform bidirectional communication. In some embodiments, the wireless power transmission apparatus 100 and the wireless power reception apparatus 200 may perform unidirectional communication or half-duplex communication.

Here, the communication scheme may be an in-band communication scheme, which uses the same frequency band as the wireless power reception apparatus 200, and/or an out-of-band communication scheme, which uses a different frequency band from the wireless power reception apparatus 200.

In one example, the information exchanged between the wireless power transmission apparatus 100 and the wireless power reception apparatus 200 may include information about the states thereof, information about the amount of used power, information about the state of charge of a battery, information about voltage/current output from a battery, control information, and the like.

Figure 2:
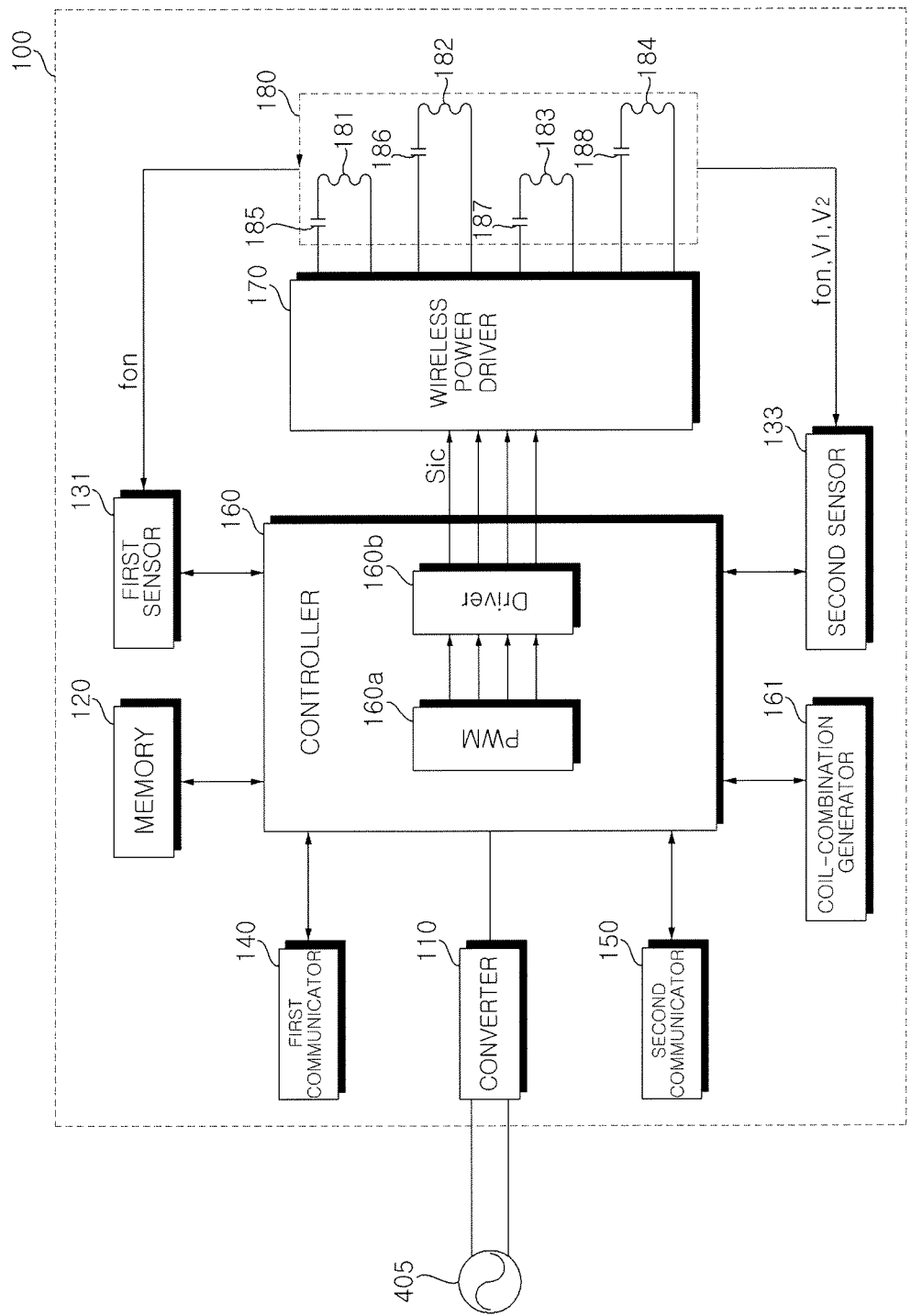
FIG. 2 is a block diagram of the internal configuration of a wireless power transmission apparatus in the wireless power system shown in FIG. 1 according to an embodiment of the present disclosure.

FIG. 2 is a block diagram of the internal configuration of the wireless power transmission apparatus in the wireless power system shown in FIG. 1.

Referring to the drawing, the wireless power transmission apparatus 100 may include a converter 110 for converting commercial alternating-current (AC) power from a commercial AC power source 405 into direct-current (DC) power, a wireless power driver 170 for converting the DC power into AC power, and a coil 180 for wirelessly transmitting power using the converted AC power.

In addition, in order to realize transmission of power and communication, the wireless power transmission apparatus 100 may further include a controller 160 for controlling the internal configuration of the wireless power transmission apparatus 100, a coil-combination generator 161 for generating combinations of coils including at least one of a plurality of coils 181 to 184, first and second communicators 140 and 150 communicating with the wireless power reception apparatus 200 using a predetermined communication scheme, a first sensor 131 for sensing a change in inductance of each of the plurality of coils, a second sensor 133 for sensing a change in a quality factor of each of the plurality of coils, and a memory 120 for storing a control program for driving the wireless power transmission apparatus 100.

The wireless power transmission apparatus 100 may be operated by DC power, which may be supplied from the converter 110, which converts commercial AC power into DC power.

The converter 110 may convert commercial AC power from the commercial AC power source 405 into DC power and may output the DC power. Although the commercial AC power source 405 is illustrated as being a single-phase AC power source in the drawing, it may be a three-phase AC power source. The internal structure of the converter 110 may vary depending on the type of the commercial AC power source 405.

The converter 110 may be constituted by diodes without a switching element, and thus may implement rectification without a separate switching operation.

For example, in the situation in which the commercial AC power source 405 is a single-phase AC power source, the converter 110 may include four diodes in the form of a bridge, and in the situation in which the commercial AC power source 405 is a three-phase AC power source, the converter 110 may include six diodes in the form of a bridge.

Alternatively, the converter 110 may be a half-bridge-type converter in which two switching elements and four diodes are interconnected. In the situation in which the commercial AC power source 405 is a three-phase AC power source, the converter 110 may include six switching elements and six diodes.

When DC power is supplied from the converter 110 to the wireless power driver 170 during wireless power transmission, the controller 160 may control the wireless power driver 170 to wirelessly transmit power to the wireless power reception apparatus 200. In this situation, the wireless power driver 170 may convert the DC power into AC power for wireless power transmission.

Specifically, the controller 160 may include a PWM generator 160*a* for generating a PWM signal and a driver 160*b* for generating and outputting a driving signal Sic based on the PWM signal.

The controller 160 may determine the duty of the PWM signal based on the amount of transmitted power, the current flowing through the wireless power driver 170, and the like. The PWM generator 160*a* may generate a PWM signal based on the duty of the PWM signal. The driver 160*b* may output a driving signal Sic for driving the wireless power driver 170 based on the PWM signal.

The wireless power driver 170 may include at least one switching element for converting DC power into AC power. For example, when the switching element is an IBGT, a gate driving signal may be output from the driver 160*b* and may be input to a gate terminal of the switching element. In addition, the switching element may perform a switching operation in response to the gate driving signal. DC power may be converted into AC power by the switching operation of the switching element, and may be output to the coil 180.

In some embodiments, the wireless power driver 170 may be included in the controller 160.

The coil 180 may include a plurality of coils 181 to 184 (hereinafter, denoted by 181 when there is no need to distinguish therebetween). The coils 181 may partially overlap each other.

The coil 180 may wirelessly transmit power to the wireless power reception apparatus 200 through any one combination of coils selected from among the plurality of coils 181.

Figure 3:
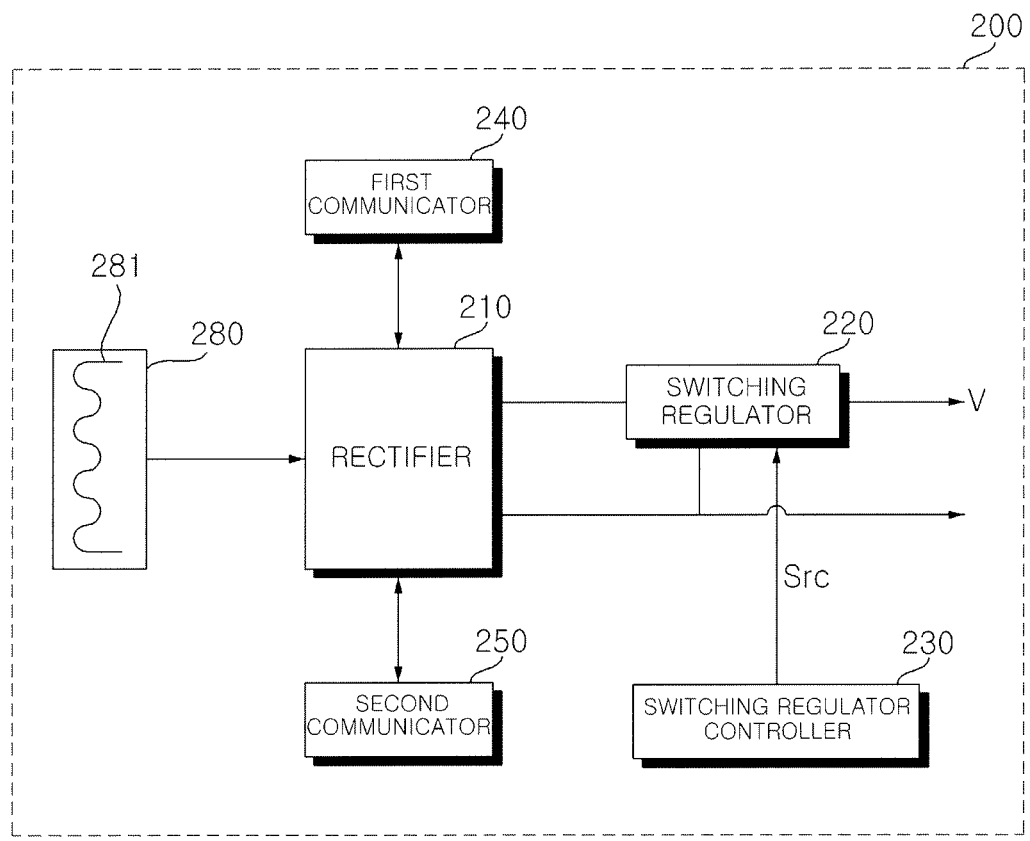
FIG. 3 is a block diagram of the internal configuration of a wireless power reception apparatus in the wireless power system shown in FIG. 1 according to an embodiment of the present disclosure.

The plurality of coils 181 may be referred to as a plurality of transmission coils 181 to distinguish the same from the reception coil 281 shown in FIG. 3.

Since the plurality of transmission coils 181 is spaced apart from the reception coil 281, leakage inductance is high and a coupling factor is low, thus leading to deterioration of transmission efficiency.

Therefore, in order to improve transmission efficiency, the wireless power transmission apparatus 100 of the present disclosure may connect a capacitor to each of the plurality of transmission coils 181 to form a resonant circuit with the reception coil 281.

In the situation in which the coil 180 forms a resonant circuit, the coil 180 may be referred to as a resonant circuit 180.

The resonant circuit 180 may include a plurality of coils 181 to 184 and a plurality of capacitor elements 185 to 188 respectively connected to the plurality of coils 181 to 184.

Each of the capacitor elements 185 to 188 may be connected in series to a respective one of the coils 181 to 184 to form a resonant circuit.

In some embodiments, unlike FIG. 2, each of the capacitor elements 185 to 188 may be connected in parallel to a respective one of the coils 181 to 184 to form a resonant circuit.

The coils 181 to 184 and the capacitor elements 185 to 188 may determine the resonant frequency of power transmission.

The resonant circuit 180 may further include a shielding material 190 (refer to FIG. 4) disposed at one side of each of the coils 181 to block a leaked magnetic field.

The structure of the resonant circuit 180 will be described in more detail later with reference to FIG. 4.

The coil-combination generator 161 may generate combinations of coils including at least one of the coils 181.

The first communicator 140 may communicate with the wireless power reception apparatus 200 using a first communication scheme. The first communicator 140 may process information about the state of the wireless power transmission apparatus 100, power control information, and the like into certain signals, and may transmit the processed signals to the wireless power reception apparatus 200. In addition, the first communicator 140 may receive information about the state of the wireless power reception apparatus 200, information about the amount of used power, charging efficiency information, and the like, may process these pieces of information into certain signals, and may transmit the processed signals to the controller 160.

The second communicator 150 may communicate with the wireless power reception apparatus 200 using a second communication scheme, which is different from the first communication scheme. The second communicator 150 may process information about the state of the wireless power transmission apparatus 100, power control information, and the like into certain signals, and may transmit the processed signals to the wireless power reception apparatus 200. In addition, the second communicator 150 may receive information about the state of the wireless power reception apparatus 200, information about the amount of used power, charging efficiency information, and the like, may process these pieces of information into certain signals, and may transmit the processed signals to the controller 160.

Each of the first communicator 140 and the second communicator 150 may further include a modulator/demodulator for modulating or demodulating a data signal transmitted from the wireless power transmission apparatus 100 and a data signal received from the wireless power reception apparatus 200.

In addition, each of the first communicator 140 and the second communicator 150 may further include a filter for filtering a data signal from the wireless power reception apparatus 200. In this situation, the filter may include a band pass filter (BPF).

The first communication scheme may be an in-band communication scheme, which uses the same frequency band as the wireless power reception apparatus 200, and the second communication scheme may be an out-of-band communication scheme, which uses a different frequency band from the wireless power reception apparatus 200.

The wireless power transmission apparatus 100 may change a communication scheme based on information about the power of the wireless power reception apparatus 200.

When an object is placed on a charging surface, the inductance of each of the coils 181 to 184 may change. In addition, variation in the inductance of each of the coils 181 to 184 may vary depending on the type of object and the location at which the object is placed.

In one example, since the wireless power reception apparatus 200 includes a magnetic shield (a shielding material) having high permeability, when the wireless power reception apparatus 200 is aligned with the first coil 181, the inductance of the first coil 181 may be increased.

In another example, when a metal material is aligned with the first coil 181, the inductance of the first coil 181 may be reduced.

The first sensor 131 may sense a change in the inductance of each of the coils 181 to 184 based on a change in the resonant frequency $f_{on}$.

Specifically, the resonant frequency $f_{on}$ may be calculated using Equation 1 below, and the first sensor 131 may sense a change in the inductance of each of the coils 181 through the resonant frequency of the resonant circuit 180.

$$f_{on} = \frac{1}{2\pi\sqrt{LC}} \qquad \text{[Equation 1]}$$

In this situation, the resonant frequency $f_{on}$ may be calculated based on the magnitude of voltage acquired from opposite ends of each of the coils 181 to 184 or each of the capacitors 185 to 188.

More specifically, the first sensor 131 may sweep the frequency to sense the voltage across the opposite ends of each of the coils 181 to 184 or each of the capacitors 185 to 188. In this situation, the frequency may be the operating frequency of the wireless power transmission apparatus 100.

The first sensor 131 may sense the voltage across the opposite ends of each of the coils 181 to 184 or each of the capacitors 185 to 188 while sweeping from the minimum frequency to the maximum frequency in the frequency band.

The first sensor 131 may include a first voltage sensor for sensing the voltage across the opposite ends of each of the coils 181 to 185 or each of the capacitors 185 to 188.

As the frequency increases, the voltage across the opposite ends of each of the coils 181 to 184 or each of the capacitors 185 to 188 may gradually increase and then decrease.

The first sensor 131 may calculate the resonant frequency $f_{on}$ of each of the coils 181 to 184 based on the maximum voltage gain acquired from opposite ends of each of the coils 181 to 184 in accordance with the sweep of the frequency.

The first sensor 131 may calculate a frequency corresponding to the maximum voltage gain as the resonant frequency $f_{on}$ of each of the coils 181 to 184.

The resonant frequency $f_{on}$ of each of the coils 181 to 184 may vary depending on the type of object and the location at which the object is placed. The first sensor 131 may calculate the inductance of each of the coils 181 to 184 using the resonant frequency $f_{on}$ of each of the coils 181 to 184, may sense a change in the inductance of each of the coils 181 to 184, and may transmit the sensing result to the controller 160.

When an object is placed on the charging surface, the voltage across the opposite ends of each of the coils 181 to 184 may change, and thus the quality factor Q of each of the coils 181 to 184 may also change.

The second sensor 133 may calculate the quality factor Q of each of the coils 181 to 184 based on the maximum voltage gain acquired from opposite ends of each of the coils 181 to 184 in accordance with the sweep of the frequency.

Specifically, the quality factor Q may be calculated using Equation 2 below. Here, Q may be the quality factor, V2 may be the maximum voltage gain, and V1 may be the input $$Q = \frac{V2}{V1}$$ [Equation 2]

That is, the second sensor 133 may calculate the quality factor Q of each of the coils 181 to 184 based on the maximum voltage gain acquired from opposite ends of each of the coils 181 to 184 in accordance with the sweep of the frequency.

Thus, the second sensor 133 may include a second voltage sensor for sensing the voltage across the opposite ends of each of the coils 181 to 184 or each of the capacitors 185 to 188.

The maximum voltage gain V2 of each of the coils 181 to 184 may vary depending on the type of object and the location at which the object is placed. The second sensor 133 may calculate the quality factor Q of each of the coils 181 to 184 using the maximum voltage gain V2 of each of the coils 181 to 184, may sense a change in the quality factor of each of the coils 181 to 184, and may transmit the sensing result to the controller 160.

The memory 120 may store a program for operating the power transmission apparatus 100.

In addition, the memory 120 may store the transmission intensity of an object sensing signal transmitted from each of the coils to sense the object on the charging surface.

In addition, the memory 120 may store the transmission intensity of a coil selection signal transmitted from each of the coils.

In this situation, each of the transmission intensity of the object sensing signal and the transmission intensity of the coil selection signal may be the intensity set through factory calibration.

Figure 4:
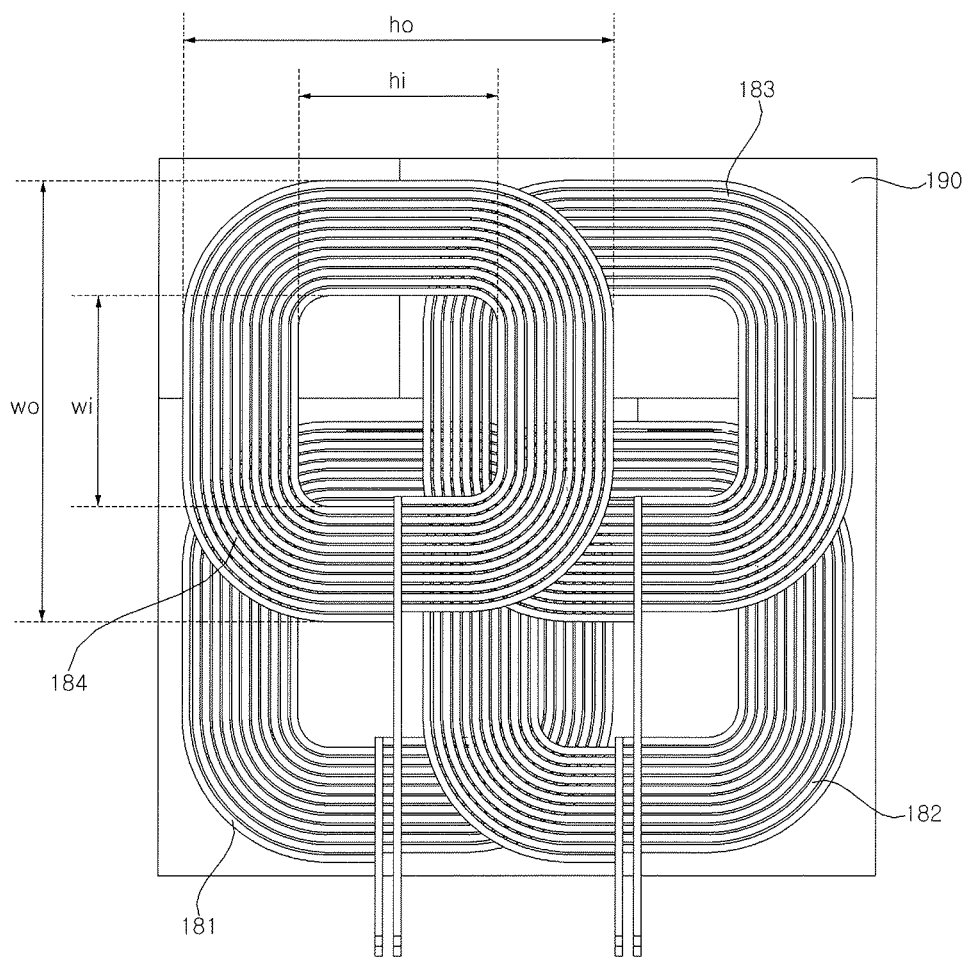
FIG. 4 is a view for explaining the structure of a coil shown in FIG. 2 according to an embodiment of the present disclosure.

Specifically, as shown in FIG. 4, the coils 181 to 184 of the present disclosure partially overlap each other to form layers therebetween. Thus, although the coils transmit the object sensing signals and the coil selection signals with the same transmission intensity, the intensities of the object sensing signals and the coil selection signals in the charge surface, on which the wireless power reception apparatus 200 is placed, may be different from each other.

The difference in the intensity between the object sensing signals and between the coil selection signals in the charging surface may cause an error in sensing the object and combining the operating coils.

In order to solve this problem, the transmission intensities of the object sensing signals and the transmission intensities of the coil selection signals may be set in consideration of the distance between each of the coils and the charging surface on which the wireless power reception apparatus 200 is placed.

For example, when the distance between the charging surface and the coil increases, the transmission intensity of the object sensing signal and the transmission intensity of the coil selection signal may be set to gradually increase.

Accordingly, the intensities of the object sensing signals in the charging surface, on which the wireless power reception apparatus 200 is placed, may be the same. In addition, the intensities of the coil selection signals in the charging surface may be the same. The corrected transmission intensities of the object sensing signals and the corrected transmission intensities of the coil selection signals may be values set through factory calibration, and may be stored in the memory 120.

The memory 120 may store reference resonant frequency variation, reference quality factor variation, and reference inductance variation in a normal state. Here, the normal state may be the state in which only the wireless power reception apparatus 200 is present on the charging surface, without a foreign object thereon.

In particular, the memory 120 may store information about a reference region, which is calculated based on the reference quality factor variation and the reference inductance variation.

The memory 120 may store a plurality of reference regions corresponding to combinations of feature values to be described later.

The controller 160 may control the overall operation of the wireless power transmission apparatus 100.

The controller 160 may select a combination of operating coils to be used for wireless power transmission from the combinations of coils generated by the coil-combination generator 161, and may charge the wireless power reception apparatus 200 through the selected combination of operating coils.

Specifically, the controller 160 may transmit a coil selection signal and may receive a response signal with respect to the coil selection through the coil included in the combination of coils.

In addition, the controller 160 may select a combination of operating coils to be used for wireless power transmission while combining the coils based on the intensity of the response signal and the charging efficiency of the wireless power reception apparatus 200.

The controller 160 may wirelessly transmit power to the wireless power reception apparatus 200 through the combination of operating coils.

The coil-combination generator 161 may transmit an object sensing signal through the coils 181, and may calculate ineffective coils based on variation in the current of the object sensing signal.

In addition, the coil-combination generator 161 may generate combinations of effective coils, excluding ineffective coils among the coils 181.

In this situation, the controller 160 may select a combination of operating coils to be used for wireless power transmission from the combinations of effective coils.

The coil-combination generator 161 may calculate the power of the wireless power reception apparatus 200 based on the inherent information about the wireless power reception apparatus 200, which is received through the coil 180, and may calculate the number of operating coils based on the calculated power of the wireless power reception apparatus 200.

In addition, the coil-combination generator 161 may generate combinations of coils in accordance with the number of operating coils.

Unlike FIG. 2, the coil-combination generator 161 may be a component included in the controller 160. That is, the coil-combination generator 161 may be implemented as a part of the controller 160.

In particular, the controller 160 may determine whether a foreign object is present on the charging surface.

Specifically, the controller 160 may receive information about a change in the inductance of each of the coils 181 to 184, which is sensed by the first sensor 131, and information about a change in the quality factor of each of the coils 181 to 184, which is sensed by the second sensor 133, and may calculate an inductance variation $\Delta L$ and a quality factor variation $\Delta Q$ of each of the coils 181 to 184.

The controller 160 may calculate a plurality of feature values for detecting a foreign object based on the inductance variation $\Delta L$ and the quality factor variation $\Delta Q$. In this situation, when an object or a foreign object is present on the charging surface, the feature values may refer to factors that are specially used to detect a foreign object in the embodiment of the present disclosure among the factors that change.

In this situation, the feature values may include average inductance variation $\Delta L/4$, average quality factor variation $\Delta Q/4$, maximum-minimum inductance variation $\Delta Lmax-min$, and maximum-minimum quality factor variation $\Delta Qmax-min$.

The wireless power transmission apparatus 100 according to the embodiment of the present disclosure does not detect a foreign object on the charging surface using only the inductance variation $\Delta L$ and/or the quality factor variation $\Delta Q$ of each of the coils 181 to 184, but detects a foreign object on the charging surface using the average inductance variation $\Delta L/4$, the average quality factor variation $\Delta Q/4$, the maximum-minimum inductance variation $\Delta Lmax-min$, and the maximum-minimum quality factor variation $\Delta Qmax-min$. Thus, the wireless power transmission apparatus 100 does not sensitively respond to a change in the threshold of the inductance variation $\Delta L$ and/or the quality factor variation $\Delta Q$ of each of the coils 181 to 184, but is capable of more accurately detecting a foreign object in a wider area.

The controller 160 may select a combination of feature values from a plurality of feature values. The controller 160 may determine whether a foreign object is present on the charging surface based on whether the combination of feature values selected from the plurality of feature values falls within a reference region on the coordinate plane.

The wireless power transmission apparatus 100 according to the embodiment of the present disclosure may display a plurality of feature values extracted from the inductance variation $\Delta L$ and the quality factor variation $\Delta Q$ on the coordinate plane, and may two-dimensionally detect a foreign object based thereon, thereby detecting a foreign object more accurately than a configuration of one-dimensionally detecting a foreign object based on only one of the inductance variation $\Delta L$ and the quality factor variation $\Delta Q$.

A foreign object detection method of the wireless power transmission apparatus 100 will be described in more detail later with reference to FIG. 7. The wireless power transmission apparatus 100 according to the embodiment of the present disclosure may further include a sensor for measuring the temperature of each of the coils 181 to 184 and the voltage and current of the power transmitted to the wireless power reception apparatus 200. In this situation, the controller 160 may interrupt the wireless transmission of power to the wireless power reception apparatus 200 based on information about the voltage, current, and temperature measured by the sensor.

FIG. 3 is a block diagram of the internal configuration of the wireless power reception apparatus in the wireless power system shown in FIG. 1.

Referring to the drawing, the wireless power reception apparatus 200 may include a power receiver 280 for receiving wireless power from the wireless power transmission apparatus 100, a rectifier 210 for rectifying the received wireless power, a switching regulator 220 for stabilizing the rectified wireless power, and a switching regulator controller 230 for controlling the switching regulator 220 to output operating power to a load.

In addition, the wireless power reception apparatus 200 may further include a first communicator 240 and a second communicator 250 to communicate with the wireless power transmission apparatus 100.

The power receiver 280 may receive wireless power transmitted from the coil 180. To this end, the power receiver 280 may include a reception coil 281.

The reception coil 281 may generate induced electromotive force using a magnetic field generated by any one of the coils 181 to 184. The wireless power caused by the induced electromotive force may be directly supplied to a load using wireless power via the rectifier 210 and the switching regulator 220, which will be described later. In the situation in which the load is a battery, the wireless power may be used to charge the battery.

The reception coil 281 may be formed in a conductive pattern having a thin-film shape on a printed circuit board (PCB). The reception coil 281 may be printed in a closed-loop shape on a reception pad. The reception coil 281 may have a form that is wound such that the polarities thereof are oriented in the same direction.

The wireless power reception apparatus 200 may further include a capacitor element for forming a circuit that resonates with the resonant circuit 180 in the wireless power transmission apparatus 100. In this situation, the capacitor element may be connected in series or in parallel to the reception coil 281.

During the reception of wireless power from the wireless power transmission apparatus 100, the rectifier 210 may rectify the wireless power received through the reception coil 281. The rectifier 210 may include at least one diode element.

The switching regulator 220 may output the rectified wireless power as charging power v, which is supplied to the battery, under the control of the switching regulator controller 230.

The switching regulator controller 230 may control the switching regulator to output charging power v by applying a regulator control signal Src to the switching regulator.

The switching regulator 220 may adjust the output voltage by performing DC-DC conversion in response to a regulator control signal Src of the switching regulator controller 230. The switching regulator 220 may control the output voltage based on the regulator control signal Src, and may output charging power v having a predetermined magnitude of voltage.

The wireless power reception apparatus 200 may not include a separate microprocessor. When the rectified charging power v is output as a predetermined magnitude of voltage by the switching regulator, the switching regulator may be controlled by the switching regulator controller 230. In the situation in which the wireless power reception apparatus 200 does not include a microprocessor, the configuration of the hardware may be simplified, and the amount of power that is consumed may be reduced.

Figure 5:
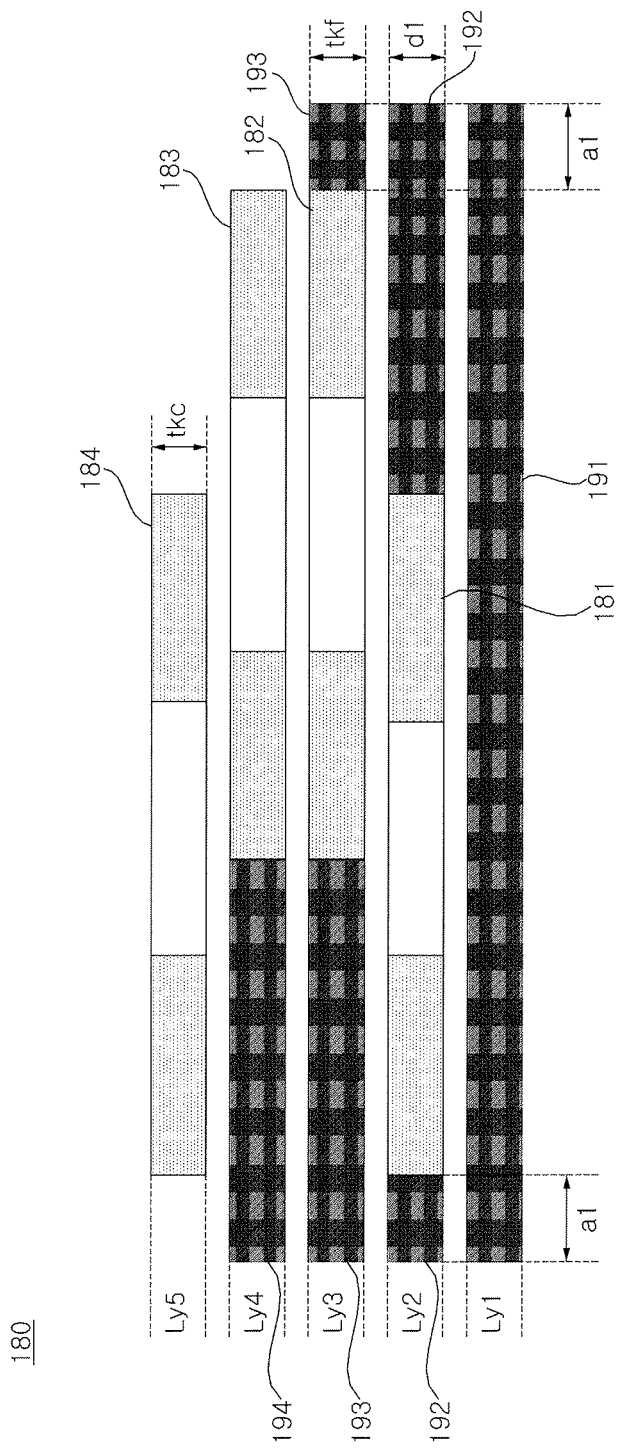
FIG. 5 is a perspective view showing the layer structure of the coil shown in FIG. 4 according to an embodiment of the present disclosure.

FIG. 4 is a view for explaining the structure of the coil shown in FIG. 2, and FIG. 5 is a perspective view showing the layer structure of the coil shown in FIG. 4.

Referring to the drawings, the coil 180 according to the embodiment of the present disclosure may include first to fourth coils 181 to 184.

Since the coil 180 is constituted by the first to fourth coils 181 to 184, rather than being a single large coil, it is possible to improve freedom in designing the charging surface and to prevent deterioration in power efficiency attributable to a stray magnetic field of a large coil.

The first to fourth coils 181 to 184 may be disposed to partially overlap each other. Specifically, as shown in FIG. 4, the first coil 181 and the second coil 182 may partially overlap each other, the second coil 182 and the third coil 183 may partially overlap each other, and the third coil 183 and the fourth coil 184 may partially overlap each other.

The overlapping regions of the first to fourth coils 181 to 184 may be set such that the size of a dead zone, which is a non-chargeable region, is minimized. Specifically, the overlapping regions of the first to fourth coils 181 to 184 may be set such that the dead zone at the center of the charging area is minimized.

Each of the first to fourth coils 181 to 184 may be manufactured to have a predetermined outer length ho, inner length hi, outer width wo, inner width wi, thickness, and number of turns. In addition, the first to fourth coils 181 to 184 may have the same outer length ho, inner length hi, outer width wo, and inner width wi as each other.

Since the fourth coil 184 is disposed closest to the wireless power reception apparatus 200, the inductance of the fourth coil 184 may be set to be smaller than the inductance of each of the first to third coils 181 to 183. The reason for this is to maintain the amount of power transmitted from the surface of the coil 180 or the power efficiency thereof at a constant level.

The first to fourth coils 181 to 184 may be disposed on the shielding material 190. The shielding material 190 may include ferrite made of one element or a combination of two or more elements selected from the group consisting of cobalt (Co), iron (Fe), nickel (Ni), boron (B), and silicon (Si). The shielding material 190 may be disposed at one side of each of the coils in order to block the leakage of magnetic fields from the coils and maximize the directivity of the magnetic fields.

The shielding material 190 may be formed in an area larger than the area in which the first to fourth coils 181 to 184 are disposed. For example, as shown in FIG. 5, the shielding material 190 may be formed to extend a distance al further than the outer sides of the first to fourth coils 181 to 184 in a horizontal direction based on FIG. 4. In addition, the shielding material 190 may be formed to extend a distance al further than the outer sides of the first to fourth coils 181 to 184 in a vertical direction based on FIG. 4.

Since the shielding material 190 is formed to be larger than the outer lengths of the first to fourth coils 181 to 184, it is possible to reduce the leakage of magnetic fields from the coils and to maximize the directivity of the magnetic fields.

Meanwhile, since the first to fourth coils 181 to 184 are disposed to partially overlap each other, the non-overlapping regions thereof may be separated from each other. For example, as shown in FIG. 5, since the first coil 181 and the second coil 182 partially overlap each other, the non-overlapping regions thereof may be spaced a distance dl apart from each other.

Due to this spacing distance, the leakage of a magnetic field from the second coil 182 may not be blocked, the transmission efficiency of the wireless power transmission apparatus 100 may be reduced, and the magnetic field may be dispersed. In addition, due to this spacing distance, the wireless power transmission apparatus 100 may be easily damaged by external shocks.

In order to solve these problems, the first to fourth coils 181 to 184 and the shielding material 190 may be formed in a layered structure.

Specifically, a base shielding material 191 may be disposed in a first layer ly1 of the coil 180.

The first coil 181 and a first shielding material 192 may be disposed in a second layer ly2, which is formed above the basic shielding material 191.

The second coil 182, which partially overlaps the first coil 181, may be disposed in a third layer ly3, which is formed above the first coil 181. In this situation, the first shielding material 192 disposed in the second layer ly2 may prevent a separation phenomenon, which may be caused by the partially overlapping structure of the first coil 181 and the second coil 182.

In the same manner, a second shielding material 193 as well as the second coil 182 may be disposed in a third layer ly3 of the coil 180.

The third coil 183, which partially overlaps the second coil 182, may be disposed in a fourth layer ly4, which is formed above the second coil 182. In this situation, the second shielding material 193 disposed in the third layer ly3 may prevent a separation phenomenon, which may be caused by the partially overlapping structure of the second coil 182 and the third coil 183.

In addition, a third shielding material 194 as well as the third coil 183 may be disposed in a fourth layer ly4 of the coil 180. The third shielding material 194 may prevent a separation phenomenon, which may be caused by the partially overlapping structure of the third coil 183 and the fourth coil 184.

In addition, since the first to fourth coils 181 to 184 need to be bonded to the shielding material 190 (including the base shielding material 191 and the first to third shielding materials 192 to 194) without being separated from each other, it is preferable that the thickness tkf of the shielding material be the same as the thickness tkc of each of the first to fourth coils 181 to 184.

Although the layers of the coil 180 are illustrated as being spaced apart from each other in FIG. 5, this is for convenience of explanation. The layers of the coil 180 may be in close contact with each other.

Due to the structure of the coil 180 shown in FIG. 5, a separation phenomenon of the first to fourth coils 181 to 184, which partially overlap each other, may be prevented, and damage to the first to fourth coils 181 to 184 due to external shocks may be prevented.

In addition, the shielding material 190, which is disposed at one side of each of the coils, may block the leakage of magnetic fields from the coils and may maximize the directivity of the magnetic fields, thereby increasing transmission efficiency.

In addition, since the shielding material 190 is disposed between the coils, it is possible to more easily reduce the generation of heat from the multiple coils.

The first to fourth coils 181 to 184 may be accommodated in a case. The wireless power reception apparatus 200 may be placed on one surface of the case. When the wireless power reception apparatus 200 is placed on one surface of the case, the coil 180 may wirelessly transmit power to charge the wireless power reception apparatus 200, and thus the surface of the case on which the wireless power reception apparatus 200 is placed may be referred to as a charging surface. In addition, the term "charging surface" and the term "interface surface" may be used interchangeably.

Figure 6:
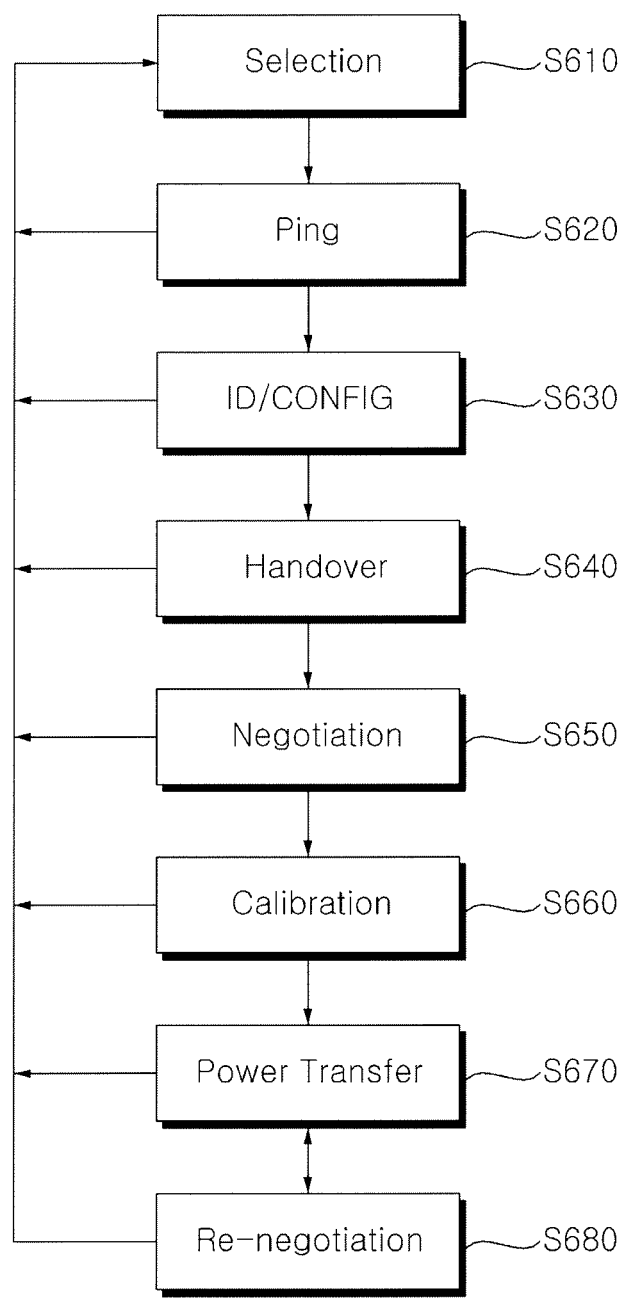
FIG. 6 is a flowchart for explaining a wireless power transmission method according to an embodiment of the present disclosure.

FIG. 6 is a flowchart for explaining a wireless power transmission method according to an embodiment of the present disclosure.

Referring to the drawing, a wireless power transmission method may include a selection phase S610, a ping phase S620, an identification and configuration phase S630, a handover phase S640, a negotiation phase S650, a calibration phase S660, a power transfer phase S670, and a re-negotiation phase S680.

In the selection phase S610, the wireless power transmission apparatus 100 may sense the presence or absence of objects within a sensing area.

When sensing the presence or absence of objects within a sensing area, the wireless power transmission apparatus 100 may sense the presence or absence of an object within a charging area based on a change in power with respect to an object sensing signal (e.g., a change in the current of the coil). In this situation, the object sensing signal may be an analog ping (AP) signal having a very short pulse. The wireless power transmission apparatus 100 may transmit an analog ping signal at predetermined time intervals until an object present on the charging surface is sensed.

In the situation in which the wireless power transmission apparatus 100 includes a plurality of coils 181, the wireless power transmission apparatus 100 may transmit object sensing signals through the coils 181 in a predetermined order, and may sense the presence or absence of an object within the charging area based on variation in the current of the coils with respect to the respective object sensing signals.

Specifically, when variation in the current is greater than or equal to a predetermined value, the wireless power transmission apparatus 100 may determine that an object is present within the charging area corresponding to the corresponding coil. In this situation, the corresponding coil may be referred to as an effective coil, which is used for effective coil combination to be described later.

When variation in the current is less than the predetermined value, the wireless power transmission apparatus 100 may determine that no object is present within the charging area corresponding to the corresponding coil. In this situation, the corresponding coil may be referred to as an ineffective coil, which is not used for effective coil combination.

In addition, when the wireless power transmission apparatus 100 includes a plurality of coils 181, the wireless power transmission apparatus 100 may select a combination of operating coils to be used for wireless power transmission in the selection phase S610.

Specifically, in the selection phase S610, the wireless power transmission apparatus 100 may generate combinations of coils including at least one of the coils 181.

In addition, the wireless power transmission apparatus 100 may transmit a coil selection signal and may receive a response signal with respect to the coil selection signal through the coil included in the combination of coils.

In addition, the wireless power transmission apparatus 100 may select a combination of operating coils to be used for wireless power transmission based on the intensity of the response signal and the charging efficiency of the wireless power reception apparatus.

In this situation, the coil selection signal may be a digital ping (DP) signal. In order to distinguish the same from a digital ping (DP) signal output in the ping phase S620 to be described later, the digital ping (DP) signal output in the selection phase S610 may be referred to as a coil selection digital ping (CSDP) signal.

The transmission intensity of the coil selection digital ping (CSDP) signal may be set by taking into consideration the distance between each of the coils and the charging surface on which the wireless power reception apparatus 200 is placed.

The coil selection digital ping (CSDP) signal may have different characteristics, such as a frequency and transmission intensity, from the digital ping (DP) signal output in the ping phase S620. For example, the coil selection digital ping (CSDP) signal may be set to have lower transmission intensity than the digital ping (DP) signal, thereby reducing the amount of power consumed in the wireless power transmission apparatus 100.

The coil selection digital ping (CSDP) signal may be a signal specialized to efficiently select a combination of coils.

For example, the wireless power transmission apparatus 100 may transmit a coil selection digital ping (CSDP) signal and may receive inherent information about the wireless power reception apparatus 200. The wireless power transmission apparatus 100 may calculate the power of the wireless power reception apparatus 200 based on the inherent information. The wireless power transmission apparatus 100 may calculate the number of operating coils for efficient coil combination in consideration of the power of the wireless power reception apparatus 200, and may generate combinations of coils in accordance with the calculated number of operating coils.

Subsequently, when the wireless power transmission apparatus 100 senses an object present on the charging surface in the selection phase S610, the wireless power transmission apparatus 100 may measure a change in the inductance of the resonant circuit 180 and a change in the quality factor.

In one embodiment of the present disclosure, when an object is sensed in the selection phase S610, the wireless power transmission apparatus 100 may measure a change in the inductance and a change in the quality factor in order to determine whether a foreign object is present on the charging surface in addition to the wireless power reception apparatus 200.

In the selection phase S610, the wireless power transmission apparatus 100 may calculate an inductance variation $\Delta L$ and a quality factor variation $\Delta Q$ of each of the coils 181 to 184 based on the information about the change in the inductance and the information about the change in the quality factor.

In addition, the wireless power transmission apparatus 100 may calculate a plurality of feature values for detecting a foreign object and may generate combinations of feature values based on the inductance variation $\Delta L$ and the quality factor variation $\Delta Q$.

In addition, in the selection phase S610, the wireless power transmission apparatus 100 may determine whether a foreign object is present on the charging surface based on whether the combination of feature values selected from the plurality of feature values falls within a reference region on the coordinate plane.

Alternatively, in the negotiation phase S650 to be described later, the wireless power transmission apparatus 100 may determine whether a foreign object is present on the charging surface based on whether the combination of feature values selected from the plurality of feature values falls within a reference region on the coordinate plane.

For example, when the combination of feature values falls within the reference region on the coordinate plane, the wireless power transmission apparatus 100 may determine that no foreign object is present on the charging surface. On the other hand, when the combination of feature values does not fall within the reference region on the coordinate plane, the wireless power transmission apparatus 100 may determine that a foreign object is present on the charging surface.

In this situation, the reference region may be a region in which the combination of feature values is located on the coordinate plane when only the wireless power reception apparatus 200 is present on the charging surface, without a foreign object thereon.

A foreign object may be a metallic object, including for example a coin, a key, and the like. The term "foreign object" may be abbreviated as "FO".

The sensing area may be an area in which the wireless power transmission apparatus 100 is capable of transmitting power. Alternatively, the sensing area may be a charging area, a charging surface, or an active area of the interface surface, in which the wireless power reception apparatus 200 is charged.

In the selection phase S610, the wireless power transmission apparatus 100 may continuously sense the displacement or removal of an object within the sensing area. In addition, upon detecting an object within the sensing area, the wireless power transmission apparatus 100 may transition from the selection phase S610 to the ping phase S620.

Upon detecting an object, the wireless power transmission apparatus 100 may wake up the wireless power reception apparatus 200 and may transmit a reception apparatus sensing signal to identify whether the detected object is the wireless power reception apparatus 200 in the ping phase S620. In this situation, the reception apparatus sensing signal may be a digital ping (DP) signal.

The digital ping (DP) signal may be set to have a higher duty than an analog ping (AP) signal in order to attempt to establish communication with the wireless power reception apparatus 200.

The wireless power reception apparatus 200 may modulate the digital ping (DP) signal and may transmit the modulated digital ping (DP) signal to the wireless power transmission apparatus 100.

The wireless power transmission apparatus 100 may demodulate the modulated digital ping (DP) signal and may acquire sensing data in a digital form, which corresponds to a response to the reception apparatus sensing signal, from the demodulated digital ping (DP) signal.

The wireless power transmission apparatus 100 may recognize the wireless power reception apparatus 200, which is the target of power transmission, based on the sensing data in a digital form.

For example, the sensing data may include information about the degree of inductive coupling between the wireless power transmission apparatus 100 and the wireless power reception apparatus 200. The wireless power transmission apparatus 100 may identify the wireless power reception apparatus 200 based on the degree of inductive coupling between the wireless power transmission apparatus 100 and the wireless power reception apparatus 200.

In the situation in which the wireless power transmission apparatus 100 includes a plurality of coils 181, the transmission of the reception apparatus sensing signal and the reception of the sensing data in the ping phase S620 described above may be performed through the combination of operating coils selected in the selection phase S610.

Upon identifying the wireless power reception apparatus 200, the wireless power transmission apparatus 100 may transition from the ping phase S620 to the identification and configuration phase S630.

Alternatively, if sensing data in a digital form is not received, the wireless power transmission apparatus 100 may transition from the ping phase S620 back to the selection phase S610.

In the identification and configuration phase S630, the wireless power transmission apparatus 100 may receive identification information, power information, and the like, which are transmitted from the wireless power reception apparatus 200, and may perform control such that the power is efficiently transmitted.

In the identification and configuration phase S630, the wireless power reception apparatus 200 may transmit identification data.

The identification data may include information about the version of a wireless power transfer protocol, information about the manufacturer of the wireless power reception apparatus 200, basic device identifier information, information indicating the presence or absence of an extended device identifier, and the like.

In addition, in the identification and configuration phase S630, the wireless power reception apparatus 200 may transmit power data.

The power data may include information about the maximum power of the wireless power reception apparatus 200, information about the remaining power, power class information, and the like.

The wireless power transmission apparatus 100 may identify the wireless power reception apparatus 200 based on the identification data and the power data, and may acquire information about the power of the wireless power reception apparatus 200.

Upon identifying the wireless power reception apparatus 200 and acquiring information about the power of the wireless power reception apparatus 200, the wireless power transmission apparatus 100 may transition from the identification and configuration phase S630 to the handover phase S640.

Alternatively, if the identification data and/or the power data is not received, the wireless power transmission apparatus 100 may transition from the identification and configuration phase S630 back to the selection phase S610.

In the handover phase S640, the wireless power transmission apparatus 100 may determine whether to change the method of communicating with the wireless power reception apparatus 200.

Specifically, in the state of communicating with the wireless power reception apparatus 200 through an in-band communication method, the wireless power transmission apparatus 100 may determine whether to maintain the in-band communication method or to change from the in-band communication method to an out-of-band communication method based on the information about the power of the wireless power reception apparatus 200 acquired in at least one of the selection phase S610, the ping phase S620, or the identification and configuration phase S630.

In addition, the wireless power transmission apparatus 100 may determine whether entry into the negotiation phase S650 is necessary based on a negotiation field value received in the identification and configuration phase S630 or the handover phase S640.

Upon determining that negotiation is necessary, the wireless power transmission apparatus 100 may transition to the negotiation phase S650, and may perform a foreign object detection (FOD) procedure.

Alternatively, upon determining that negotiation is unnecessary, the wireless power transmission apparatus 100 may directly transition to the power transfer phase S670.

The wireless power transmission apparatus 100 may determine whether to enter the calibration phase S660 based on the result of determining whether a foreign object is present on the charging surface, which is acquired in the selection phase S610 or the negotiation phase S650.

When no foreign object is detected, the wireless power transmission apparatus 100 may transition to the power transfer phase S670 via the calibration phase S660.

Alternatively, when a foreign object is detected, the wireless power transmission apparatus 100 may transition to the selection phase S610 without transmitting power.

In the calibration phase S660, the wireless power transmission apparatus 100 may calculate power loss based on the difference between the power transmitted from the wireless power transmission apparatus 100 and the power received by the wireless power reception apparatus 200.

In the power transfer phase S670, the wireless power transmission apparatus 100 may transmit power to the wireless power reception apparatus 200.

In the power transfer phase S670, during the transmission of power, the wireless power transmission apparatus 100 may receive power control information from the wireless power reception apparatus 200 and may adjust the characteristics of the power, which is applied to the coils, in response to the received power control information.

For example, the power control information may include control error data, and the wireless power transmission apparatus 100 may increase or decrease the power applied to the coils based on the control error data.

In the power transfer phase S670, when unexpected data is received, when desired data, e.g., power control information, is not received for a predetermined amount of time (timeout), when violation of a pre-established power transfer contract occurs, or when charging is completed, the wireless power transmission apparatus 100 may transition to the selection phase S610.

In addition, in the power transfer phase S670, when power transfer negotiation needs to be reconfigured due to a change in the state of the wireless power transmission apparatus 100 or the wireless power reception apparatus 200, the wireless power transmission apparatus 100 may transition to the re-negotiation phase S680. In this situation, when the re-negotiation is normally completed, the wireless power transmission apparatus 100 may return to the power transfer phase S670.

The re-negotiation may be set based on information about the state of the wireless power transmission apparatus 100 and information about the state of the wireless power reception apparatus 200. For example, the information about the state of the wireless power transmission apparatus 100 may include information about the maximum amount of transmittable power and information about the maximum number of acceptable wireless power reception apparatuses 200. In addition, the information about the state of the wireless power reception apparatus 200 may include information about the required power.

Figure 7:
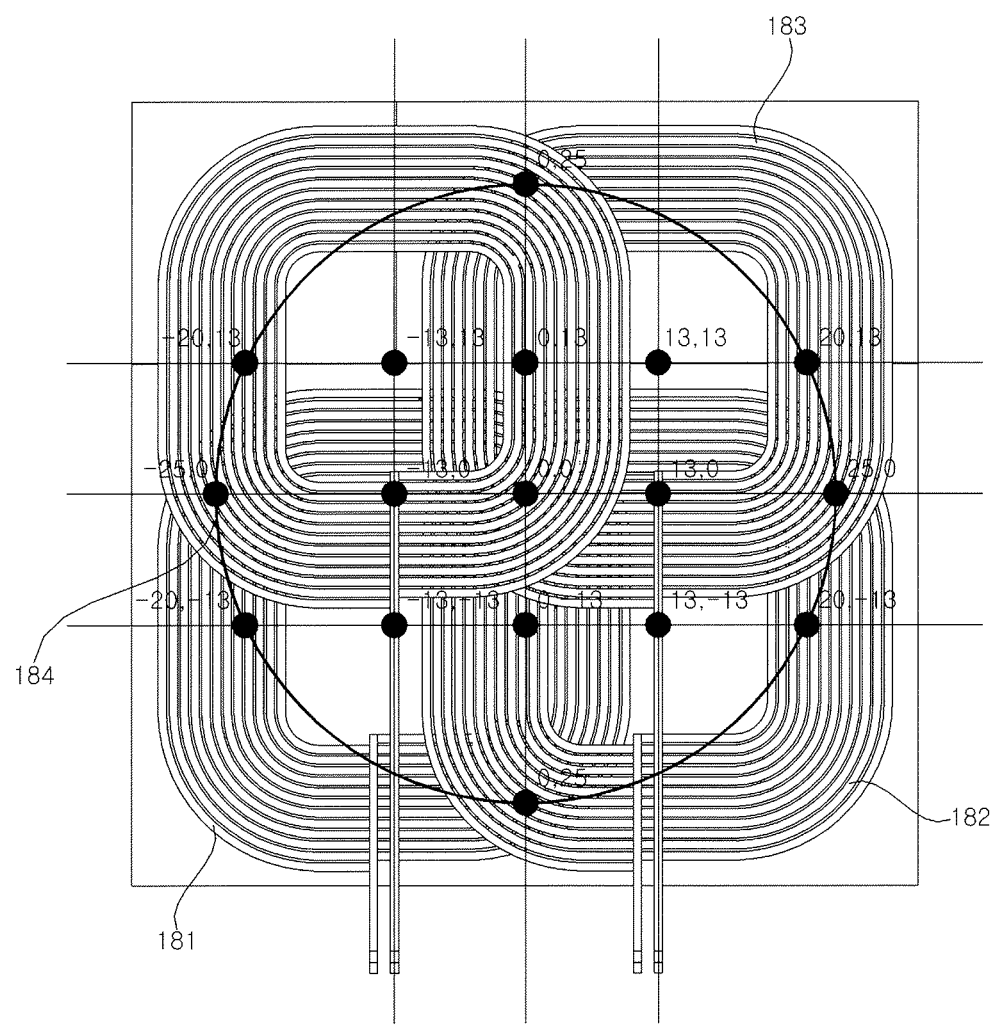
FIG. 7 is a view for explaining a reference region according to an embodiment of the present disclosure.
Figure 8:
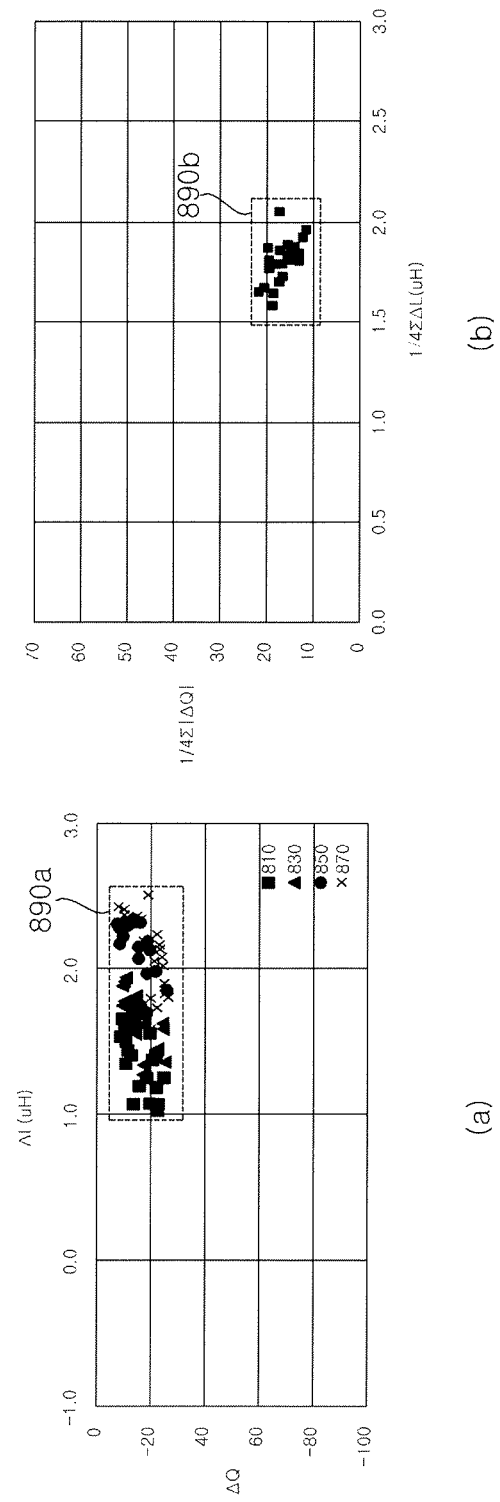
FIG. 8 is a view for explaining a reference region according to an embodiment of the present disclosure.

FIGS. 7 and 8 are views for explaining a reference region according to an embodiment of the present disclosure.

Referring to the drawings, when only the wireless power reception apparatus 200 is placed on the charging surface, the reference region may be set based on a region within which each combination of feature values is displayed on the coordinate plane.

In more detail, the coordinates, on the basis of which an object is placed on the charging surface, may be expressed as shown in FIG. 7.

In the situation in which only the wireless power reception apparatus 200 is placed at the coordinate points shown in FIG. 7, the quality factor variation $\Delta Q$ relative to the inductance variation $\Delta L$ of each of the coils 181 to 184 may be displayed on the corresponding coordinate plane, as shown in FIG. 8(a).

Here, reference numeral 810 denotes the quality factor variation $\Delta Q$ relative to the inductance variation $\Delta L$ of the first coil 181 at each coordinate point in FIG. 7, reference numeral 830 denotes the quality factor variation $\Delta Q$ relative to the inductance variation $\Delta L$ of the second coil 182 at each coordinate point in FIG. 7, reference numeral 850 denotes the quality factor variation $\Delta Q$ relative to the inductance variation $\Delta L$ of the third coil 183 at each coordinate point in FIG. 7, and reference numeral 870 denotes the quality factor variation $\Delta Q$ relative to the inductance variation $\Delta L$ of the fourth coil 184 at each coordinate point in FIG. 7.

As shown in FIG. 8(a), it can be seen that the quality factor variation $\Delta Q$ relative to the inductance variation $\Delta L$ of each of the coils 181 to 184 falls within a predetermined region denoted by reference numeral 890a.

The coordinate conversion of the quality factor variation $\Delta Q$ relative to the inductance variation $\Delta L$ shown in FIG. 8(a) into average quality factor variation $\Delta Q/4$ relative to average inductance variation $\Delta L/4$ may be expressed as shown in FIG. 8(b). In this situation, since the quality factor variation $\Delta Q$ in FIG. 8(a) has a negative value, the absolute value of the quality factor variation $\Delta Q$ may be used for the coordinate conversion for convenience of calculation.

Since the average inductance variation $\Delta L/4$ and the average quality factor variation $|\Delta Q|/4$ are used, it can be seen in FIG. 8(b) that the average inductance variation $\Delta L/4$ and the average quality factor variation $|\Delta Q|/4$ of the coils 181 to 184 are distributed in a region denoted by reference numeral 890b, which is smaller than the region 890a.

Since the region 890b is smaller than the region 890a, the resolution may be increased upon detecting a foreign object. That is, when using the average inductance variation $\Delta L/4$ and the average quality factor variation $|\Delta Q|/4$, it is possible to more accurately detect a foreign object than when using the inductance variation $\Delta L$ and the quality factor variation $\Delta Q$.

The average inductance variation $\Delta L/4$ and the average quality factor variation $|\Delta Q|/4$ may be a combination of feature values calculated based on the inductance variation $\Delta L$ and the quality factor variation $\Delta Q$.

The reference region may be a region in which each combination of feature values is located on the coordinate plane when only the wireless power reception apparatus 200 is placed on the charging surface. Thus, the reference region may be the region 890b shown in FIG. 8(b).

The memory 120 may store a plurality of reference regions corresponding to the respective combinations of feature values.

For example, in FIG. 8(b), the memory 120 may store a reference region in the coordinate plane of the average inductance variation $\Delta L/4$ and the average quality factor variation $|\Delta Q|/4$. In FIG. 8(b), the reference region may be a region in which the average inductance variation $\Delta L/4$ is from 1.59 to 2.13 uH and the average quality factor variation $|\Delta Q|/4$ is from 10.04 to 22.1.

Alternatively, the reference region may be stored in the memory 120 as a preset value.

Alternatively, the reference region may be calculated by the controller 160 through the process of receiving a quality factor from the wireless power reception apparatus 200 and of performing correlation matching. The calculated reference region may be stored in the memory 120.

The controller 160 may determine whether a foreign object is present on the charging surface based on whether combinations of feature values fall within the reference region on the coordinate plane.

When the combinations of feature values are displayed on the corresponding coordinate plane, if the combinations of feature values fall within the reference region, the controller 160 may determine that there is no foreign object.

On the other hand, when the combinations of feature values are displayed on the corresponding coordinate plane, if the combinations of feature values do not fall within the reference region, the controller 160 may determine that there is a foreign object.

However, when the detection of a foreign object is performed using only one combination of feature values, an error may occur in the foreign object detection result, as shown in FIGS. 10 to 15.

Therefore, the controller 160 may convert the coordinates of the average inductance variation $\Delta L/4$ and the average quality factor variation $|\Delta Q|/4$ shown in FIG. 8(b) into another type of coordinates, and may further perform a foreign object detection process based on the positions at which the feature values are distributed on the converted coordinate plane. The coordinate conversion will be described in more detail below.

Figure 9:
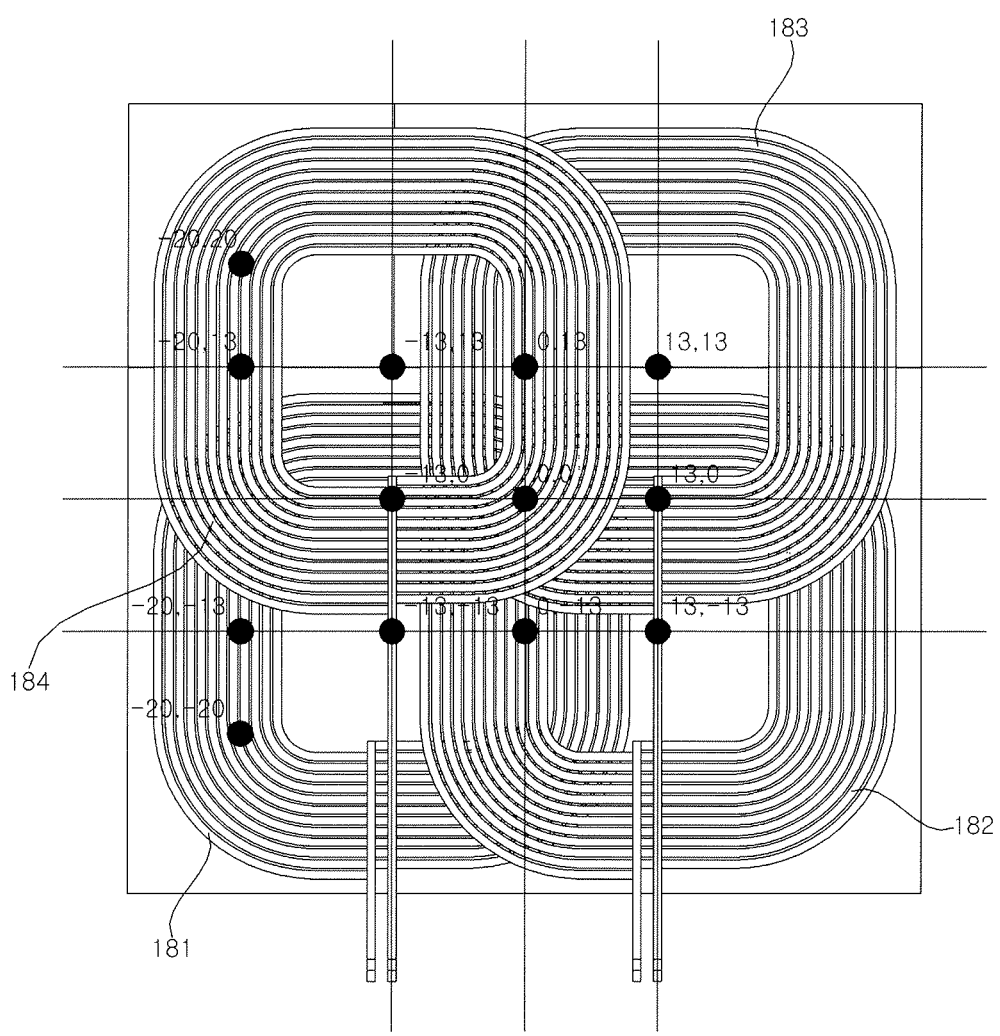
FIG. 9 is a view for explaining a position at which a foreign object is present on a charging surface according to an embodiment of the present disclosure.

FIG. 9 is a view for explaining a position at which a foreign object is present on the charging surface, and FIGS. 10 to 15 are reference views for explaining methods of detecting a foreign object.

Figure 10:
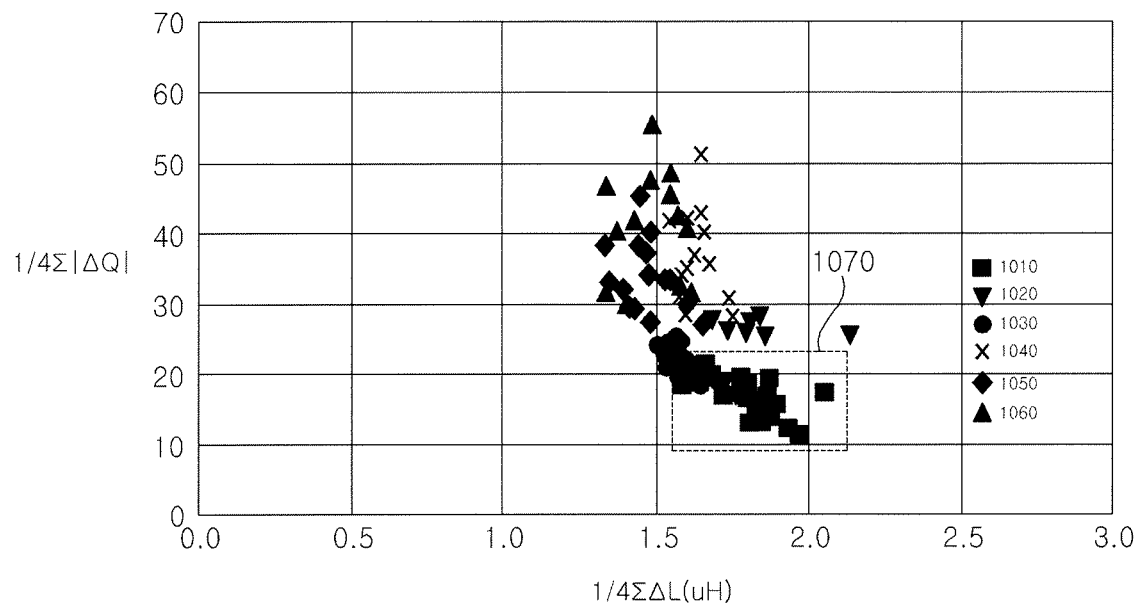
FIG. 10 is a view for explaining a method of detecting a foreign object based on a combination of average inductance variation and average quality factor variation according to an embodiment of the present disclosure.
Figure 11:
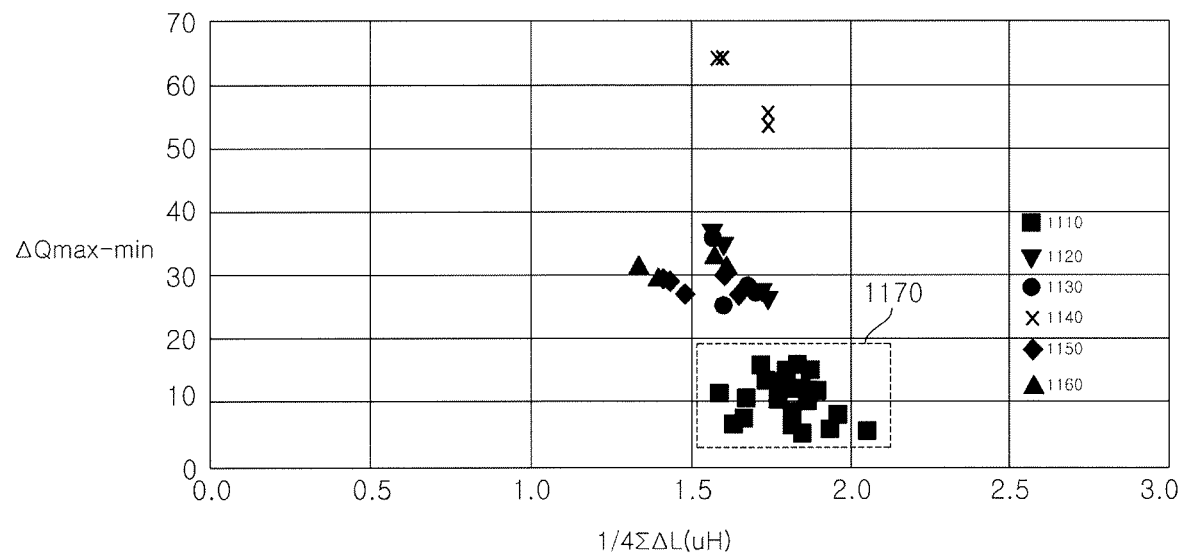
FIG. 11 is a view for explaining a method of detecting a foreign object based on a combination of average inductance variation and maximum-minimum quality factor variation according to an embodiment of the present disclosure.
Figure 12:
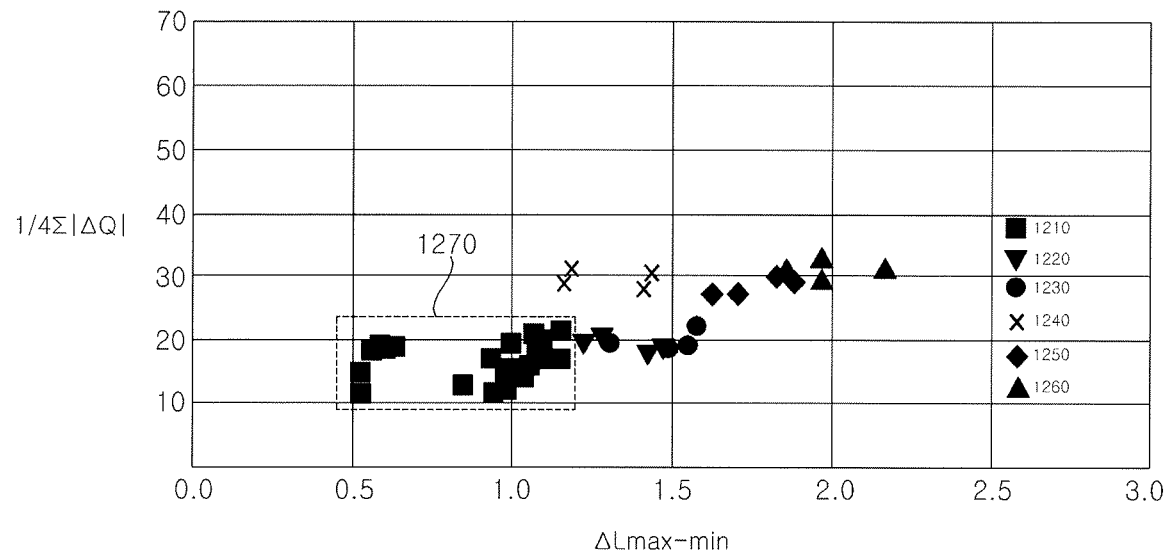
FIG. 12 is a view for explaining a method of detecting a foreign object based on a combination of maximum-minimum inductance variation and average quality factor variation according to an embodiment of the present disclosure.
Figure 13:
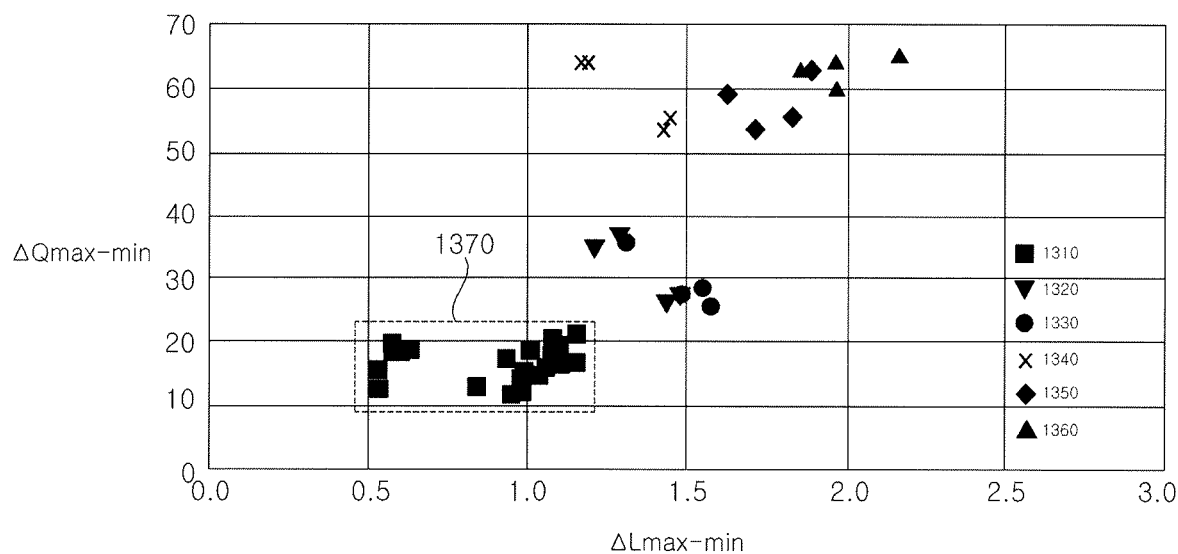
FIG. 13 is a view for explaining a method of detecting a foreign object based on a combination of maximum-minimum inductance variation and maximum-minimum quality factor variation according to an embodiment of the present disclosure.
Figure 14:
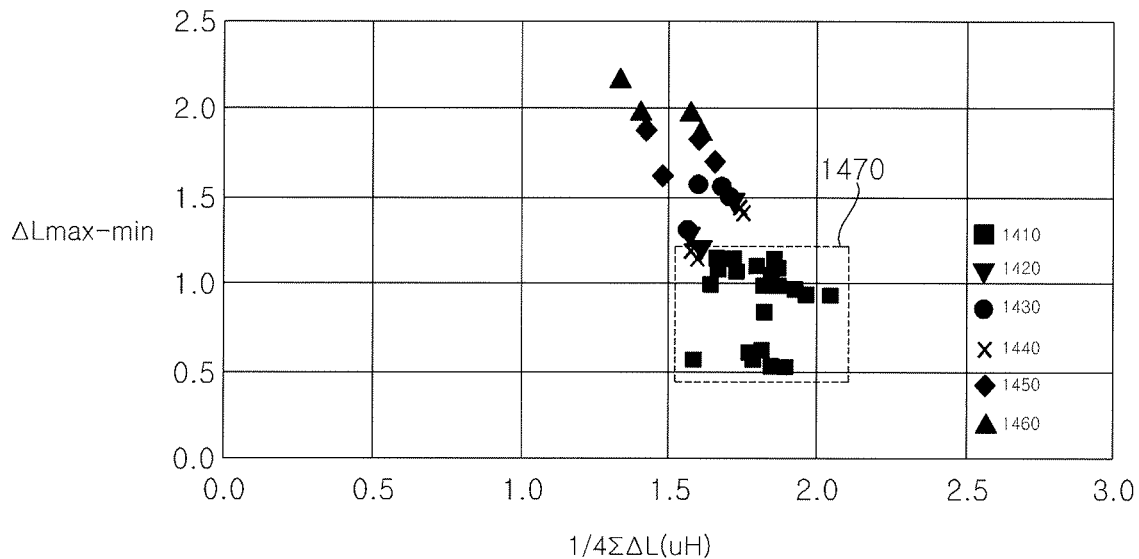
FIG. 14 is a view for explaining a method of detecting a foreign object based on a combination of average inductance variation and maximum-minimum inductance variation according to an embodiment of the present disclosure.
Figure 15:
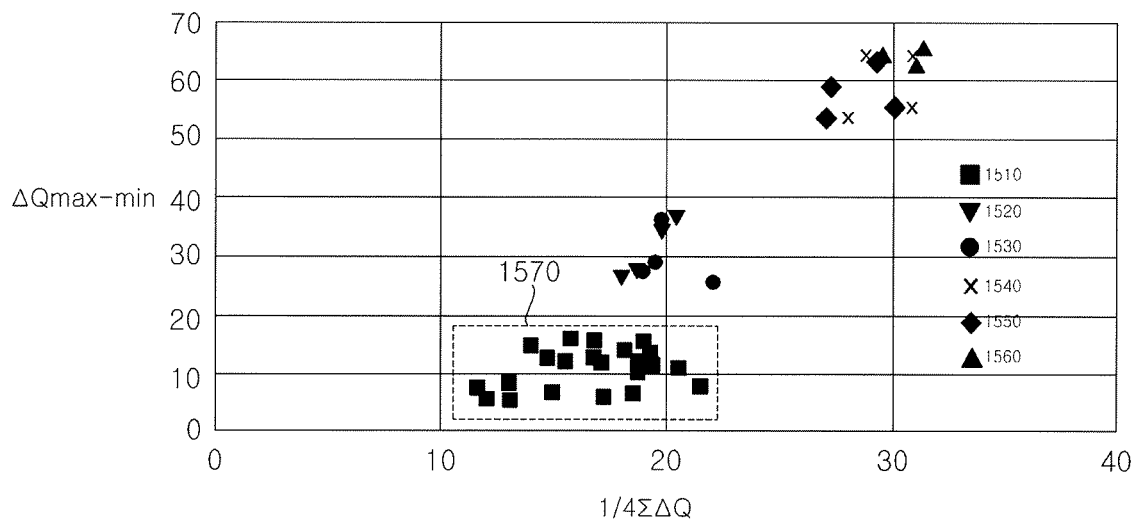
FIG. 15 is a view for explaining a method of detecting a foreign object based on a combination of average quality factor variation and maximum-minimum quality factor variation according to an embodiment of the present disclosure.

More specifically, FIG. 10 is a view for explaining a method of detecting a foreign object based on a combination of the average inductance variation and the average quality factor variation, FIG. 11 is a view for explaining a method of detecting a foreign object based on a combination of the average inductance variation and the maximum-minimum quality factor variation, FIG. 12 is a view for explaining a method of detecting a foreign object based on a combination of the maximum-minimum inductance variation and the average quality factor variation, FIG. 13 is a view for explaining a method of detecting a foreign object based on a combination of the maximum-minimum inductance variation and the maximum-minimum quality factor variation, FIG. 14 is a view for explaining a method of detecting a foreign object based on a combination of the average inductance variation and the maximum-minimum inductance variation, and FIG. 15 is a view for explaining a method of detecting a foreign object based on a combination of the average quality factor variation and the maximum-minimum quality factor variation.

Referring to the drawings, the coordinates indicating the positions at which a foreign object is placed on the charging surface may be expressed as shown in FIG. 9.

The reason why the number of coordinate points in the coordinates of the charging surface in FIG. 9 is 13 is that it is possible to estimate data at the coordinate points (−20, 20), (−20, 13), (−20, −13), and (−20, −20) and data at the coordinate points corresponding thereto.

When a foreign object and the wireless power reception apparatus 200 are placed in the coordinates shown in FIG. 9, a plurality of combinations of feature values may be displayed on the corresponding coordinate plane, as shown in FIGS. 10 to 15.

In this situation, reference numerals 1010, 1110, 1210, 1310, 1410 and 1510 may denote the situation in which only the wireless power reception apparatus 200 is placed on the charging surface, reference numerals 1020, 1120, 1220, 1320, 1420 and 1520 may denote the situation in which the wireless power reception apparatus 200 and a U.S. dime coin are placed on the charging surface, reference numerals 1030, 1130, 1230, 1330, 1430 and 1530 may denote the situation in which the wireless power reception apparatus 200 and a 100-won coin are placed on the charging surface, reference numerals 1040, 1140, 1240, 1340, 1440 and 1540 may denote the situation in which the wireless power reception apparatus 200 and a 10-won coin are placed on the charging surface, reference numerals 1050, 1150, 1250, 1350, 1450 and 1550 may denote the situation in which the wireless power reception apparatus 200 and a 50-won coin are placed on the charging surface, and reference numerals 1060, 1160, 1260, 1360, 1460 and 1560 may denote the situation in which the wireless power reception apparatus 200 and a Canadian dime coin are placed on the charging surface.

FIG. 10 is a view showing the coordinate plane of the average inductance variation $\Delta L/4$ and the average quality factor variation $|\Delta Q|/4$, on which the average quality factor variation $|\Delta Q|/4$ relative to the average inductance variation $\Delta L/4$ of the coils 181 to 184 is displayed.

It can be seen in FIG. 10 that when only the wireless power reception apparatus 200 is placed on the charging surface, the values denoted by 1010 are distributed within the region 1070. Thus, in the coordinate plane of the average inductance variation $\Delta L/4$ and the average quality factor variation $|\Delta Q|/4$, the reference region may be the region 1070.

For example, in the coordinate plane of the average inductance variation $\Delta L/4$ and the average quality factor variation $|\Delta Q|/4$, the reference region may be a region in which the average inductance variation $\Delta L/4$ is from 1.59 to 2.13 uH and the average quality factor variation $|\Delta Q|/4$ is from 10.04 to 22.1.

In addition, it can be seen in FIG. 10 that some of the values denoted by 1030 fall within the region 1070, which is the reference region, in the coordinate plane of the average inductance variation $\Delta L/4$ and the average quality factor variation $|\Delta Q|/4$.

Thus, in the situation of detecting a foreign object using only the average inductance variation $\Delta L/4$ and the average quality factor variation $|\Delta Q|/4$, even when the wireless power reception apparatus 200 and a 100-won coin are placed on the charging surface, the controller 160 is likely to determine that no foreign object is present on the charging surface.

FIG. 11 is a view showing the coordinate plane of the average inductance variation $\Delta L/4$ and the maximum-minimum quality factor variation $\Delta Q_{max-min}$, on which the maximum-minimum quality factor variation $\Delta Q_{max-min}$ relative to the average inductance variation $\Delta L/4$ of the coils 181 to 184 is displayed.

It can be seen in FIG. 11 that when only the wireless power reception apparatus 200 is placed on the charging surface, the values denoted by 1110 are distributed within the region 1170. Thus, in the coordinate plane of the average inductance variation $\Delta L/4$ and the maximum-minimum quality factor variation $\Delta Q_{max-min}$, the reference region may be the region 1170.

For example, in the coordinate plane of the average inductance variation ΔL/4 and the maximum-minimum quality factor variation ΔQmax-min, the reference region may be a region in which the average inductance variation ΔL/4 is from 1.59 to 2.13 uH and the maximum-minimum quality factor variation ΔQmax-min is from 2.19 to 17.9.

It can be seen in FIG. 11 that only values denoted by 1110 fall within the region 1170 in the coordinate plane of the average inductance variation ΔL/4 and the maximum-minimum quality factor variation ΔQmax-min, unlike FIG. 10. In addition, it can be seen that the values denoted by 1120 to 1160 are distributed while being spaced a long distance apart from the values denoted by 1110.

Thus, in the situation of detecting a foreign object using the average inductance variation ΔL/4 and the maximum-minimum quality factor variation ΔQmax-min, the controller 160 may accurately detect a foreign object.

FIG. 12 is a view showing the coordinate plane of the maximum-minimum inductance variation ΔLmax-min and the average quality factor variation |ΔQ|/4, on which the average quality factor variation |ΔQ|/4 relative to the maximum-minimum inductance variation ΔLmax-min of each of the coils 181 to 184 is displayed.

It can be seen in FIG. 12 that when only the wireless power reception apparatus 200 is placed on the charging surface, the values denoted by 1210 are distributed within the region 1270. Thus, in the coordinate plane of the maximum-minimum inductance variation ΔLmax-min and the average quality factor variation |ΔQ|/4, the reference region may be the region 1270.

For example, in the coordinate plane of the maximum-minimum inductance variation ΔLmax-min and the average quality factor variation |ΔQ|/4, the reference region may be a region in which the maximum-minimum inductance variation ΔLmax-min is from 0.5 to 1.21 uH and the average quality factor variation |ΔQ|/4 is from 10.04 to 22.1.

It can be seen in FIG. 12 that only values denoted by 1210 fall within the region 1270 in the coordinate plane of the maximum-minimum inductance variation ΔLmax-min and the average quality factor variation |ΔQ|/4, unlike FIG. 10. However, it can be seen that the values denoted by 1220 to 1260 are distributed to be very close to the values denoted by 1210 in comparison with the distribution in FIG. 11. The distribution in FIG. 12 may cause an error in detecting a foreign object.

FIG. 13 is a view showing the coordinate plane of the maximum-minimum inductance variation ΔLmax-min and the maximum-minimum quality factor variation ΔQmax-min, on which the maximum-minimum quality factor variation ΔQmax-min relative to the maximum-minimum inductance variation ΔLmax-min of each of the coils 181 to 184 is displayed.

It can be seen in FIG. 13 that when only the wireless power reception apparatus 200 is placed on the charging surface, the values denoted by 1310 are distributed within the region 1370. Thus, in the coordinate plane of the maximum-minimum inductance variation ΔLmax-min and the maximum-minimum quality factor variation ΔQmax-min, the reference region may be the region 1370.

For example, in the coordinate plane of the maximum-minimum inductance variation ΔLmax-min and the maximum-minimum quality factor variation ΔQmax-min, the reference region may be a region in which the maximum-minimum inductance variation ΔLmax-min is from 0.5 to 1.21 uH and the maximum-minimum quality factor variation ΔQmax-min is from 11.19 to 21.04.

It can be seen in FIG. 13 that only values denoted by 1310 fall within the region 1370 in the coordinate plane of the maximum-minimum inductance variation ΔLmax-min and the maximum-minimum quality factor variation ΔQmax-min, unlike FIG. 10. In addition, it can be seen that the values denoted by 1320 to 1360 are distributed while being spaced a long distance apart from the values denoted by 1310, unlike FIG. 12.

Thus, in the situation of detecting a foreign object using the maximum-minimum inductance variation ΔLmax-min and the maximum-minimum quality factor variation ΔQmax-min, the controller 160 may accurately detect a foreign object.

FIG. 14 is a view showing the coordinate plane of the average inductance variation ΔL/4 and the maximum-minimum inductance variation ΔLmax-min, on which the maximum-minimum inductance variation ΔLmax-min relative to the average inductance variation ΔL/4 of the coils 181 to 184 is displayed.

It can be seen in FIG. 14 that when only the wireless power reception apparatus 200 is placed on the charging surface, the values denoted by 1410 are distributed within the region 1470. Thus, in the coordinate plane of the average inductance variation ΔL/4 and the maximum-minimum inductance variation ΔLmax-min, the reference region may be the region 1470.

For example, in the coordinate plane of the average inductance variation ΔL/4 and the maximum-minimum inductance variation ΔLmax-min, the reference region may be a region in which the average inductance variation ΔL/4 is from 1.59 to 2.13 uH and the maximum-minimum inductance variation ΔLmax-min is from 0.5 to 1.21 uH.

It can be seen in FIG. 14 that some of the values denoted by 1420 and 1440 fall within the region 1470, which is the reference region, in the coordinate plane of the average inductance variation ΔL/4 and the maximum-minimum inductance variation ΔLmax-min, unlike FIGS. 11 to 13.

Thus, in the situation of detecting a foreign object using only the average inductance variation ΔL/4 and the maximum-minimum inductance variation ΔLmax-min, even when the wireless power reception apparatus 200 and a U.S. dime coin are placed on the charging surface or even when the wireless power reception apparatus 200 and a 10-won coin are placed on the charging surface, the controller 160 is likely to determine that no foreign object is present on the charging surface.

FIG. 15 is a view showing the coordinate plane of the average quality factor variation |ΔQ|/4 and the maximum-minimum quality factor variation ΔQmax-min, on which the maximum-minimum quality factor variation ΔQmax-min relative to the average quality factor variation |ΔQ|/4 of the coils 181 to 184 is displayed.

It can be seen in FIG. 15 that when only the wireless power reception apparatus 200 is placed on the charging surface, the values denoted by 1510 are distributed within the region 1570. Thus, in the coordinate plane of the average quality factor variation |ΔQ|/4 and the maximum-minimum quality factor variation ΔQmax-min, the reference region may be the region 1570.

For example, in the coordinate plane of the average quality factor variation |ΔQ|/4 and the maximum-minimum quality factor variation ΔQmax-min, the reference region may be a region in which the average quality factor variation |ΔQ|/4 is from 11.24 to 22.37 and the maximum-minimum quality factor variation ΔQmax-min is from 2.2 to 18.

It can be seen in FIG. 15 that only values denoted by 1510 fall within the region 1570 in the coordinate plane of the average quality factor variation $|\Delta Q|/4$ and the maximum-minimum quality factor variation $\Delta Qmax-min$, unlike FIGS. 10 and 14. In addition, it can be seen that the values denoted by 1520 to 1560 are distributed while being spaced a long distance apart from the values denoted by 1510, unlike FIG. 12.

Thus, in the situation of detecting a foreign object using the average quality factor variation $|\Delta Q|/4$ and the maximum-minimum quality factor variation $\Delta Qmax-min$, the controller 160 may accurately detect a foreign object.

FIGS. 10 to 15 illustrate the distribution of the combinations of feature values in the corresponding coordinate plane when the foreign object is a U.S. dime coin, a 100-won coin, a 10-won coin, a 50-won coin, or a Canadian dime coin. The regions within which the combinations of feature values are distributed may be different from the regions shown in FIGS. 10 to 15 depending on the size of the foreign object, the material of the foreign object (e.g., a magnetic material, metal, etc.), or the like.

That is, a specific combination of feature values may be advantageous depending on the type of foreign object. For example, depending on the type of foreign object, the feature value combination of the average inductance variation $\Delta L/4$ and the average quality factor variation $|\Delta Q|/4$ or the feature value combination of the average inductance variation $\Delta L/4$ and the maximum-minimum inductance variation $\Delta Lmax-min$ may be advantageous in detecting a foreign object.

Thus, the controller 160 may select a plurality of feature value combinations and use the same to detect a foreign object. For example, the controller 160 may detect a foreign object on the charging surface using a first feature value combination of the average inductance variation $\Delta L/4$ and the average quality factor variation $|\Delta Q|/4$ and a second feature value combination of the average inductance variation $\Delta L/4$ and the maximum-minimum quality factor variation $\Delta Qmax-min$.

In another example, the controller 160 may detect a foreign object on the charging surface using all of a first feature value combination of the average inductance variation $\Delta L/4$ and the average quality factor variation $|\Delta Q|/4$, a second feature value combination of the average inductance variation $\Delta L/4$ and the maximum-minimum quality factor variation $\Delta Qmax-min$, a third feature value combination of the maximum-minimum inductance variation $\Delta Lmax-min$ and the average quality factor variation $|\Delta Q|/4$, a fourth feature value combination of the maximum-minimum inductance variation $\Delta Lmax-min$ and the maximum-minimum quality factor variation $\Delta Qmax-min$, a fifth feature value combination of the average inductance variation $\Delta L/4$ and the maximum-minimum inductance variation $\Delta Lmax-min$, and a sixth feature value combination of the average quality factor variation $|\Delta Q|/4$ and the maximum-minimum quality factor variation $\Delta Qmax-min$.

The wireless power transmission apparatus 100 of the present disclosure detects a foreign object on the charging surface using a plurality of combinations of feature values, thereby more accurately detecting a foreign object.

Figure 16:
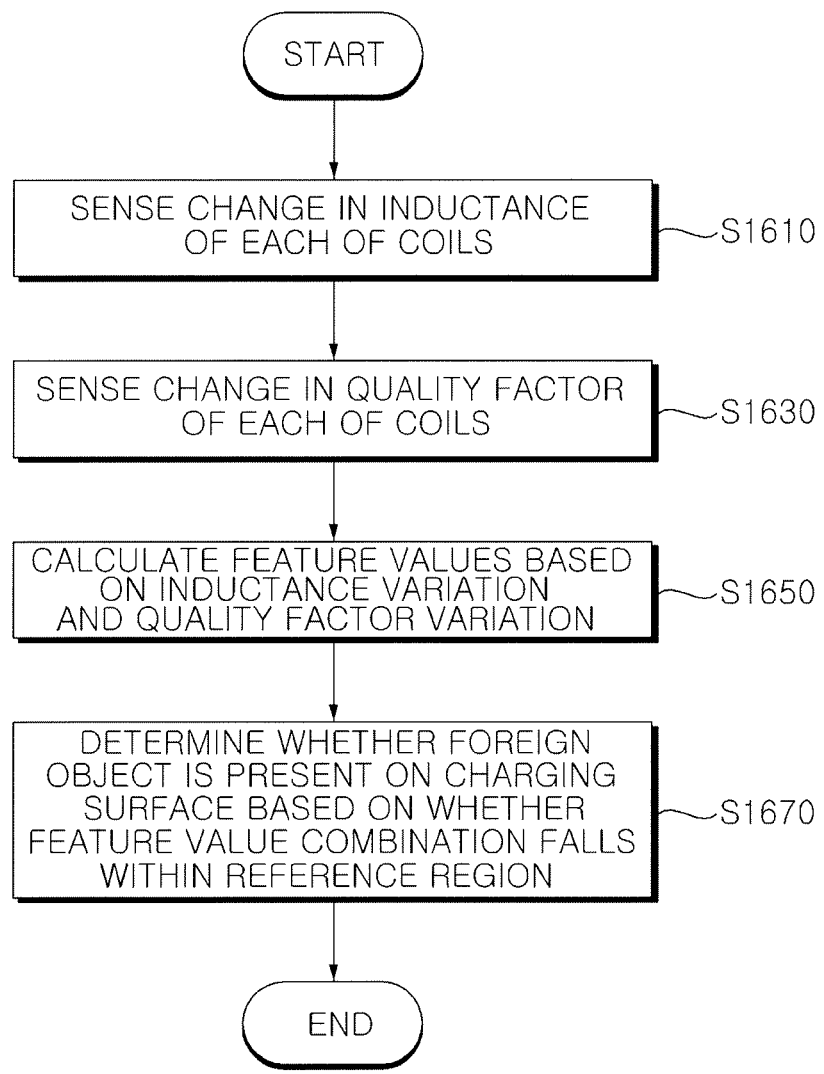
FIG. 16 is a flowchart for explaining a method of detecting a foreign object according to an embodiment of the present disclosure.

FIG. 16 is a flowchart for explaining a method of detecting a foreign object according to an embodiment of the present disclosure.

Referring to the drawing, the wireless power transmission apparatus 100 according to the embodiment of the present disclosure may sense a change in the inductance of each of the coils 181 to 184 (S1610).

Specifically, when an object is placed on the charging surface, the inductance of each of the coils 181 to 184 may change. In addition, variation in the inductance of each of the coils 181 to 184 may vary depending on the type of object and the location at which the object is placed.

The first sensor 131 may sense a change in the inductance of each of the coils 181 to 184 based on a change in the resonant frequency $f_{on}$.

The first sensor 131 may calculate the resonant frequency $f_{on}$ of each of the coils 181 to 184 based on the magnitude of voltage acquired from opposite ends of each of the coils 181 to 184 in accordance with the sweep of the frequency.

The first sensor 131 may calculate the inductance of each of the coils 181 to 184 using the resonant frequency $f_{on}$.

The first sensor 131 may sense a change in the inductance of each of the coils 181 to 184 and may transmit the sensing result to the controller 160.

Subsequently, the wireless power transmission apparatus 100 may sense a change in the quality factor of each of the coils 181 to 184 (S1630).

Specifically, when an object is placed on the charging surface, the inductance of each of the coils 181 to 184 and/or the series resistance component in each of the coils 181 to 184 may change. Accordingly, the voltage across the opposite ends of each of the coils 181 to 184 may also change.

The second sensor 133 may calculate the quality factor of each of the coils 181 to 184 based on the maximum voltage gain acquired from opposite ends of each of the coils 181 to 184 in accordance with the sweep of the frequency.

The second sensor 133 may sense a change in the quality factor of each of the coils 181 to 184 and may transmit the sensing result to the controller 160.

Subsequently, the controller 160 of the wireless power transmission apparatus 100 may calculate a plurality of feature values for detecting a foreign object based on the inductance variation and the quality factor variation (S1650).

Specifically, the controller 160 may receive information about a change in the inductance of each of the coils 181 to 184, which is sensed by the first sensor 131, and information about a change in the quality factor of each of the coils 181 to 184, which is sensed by the second sensor 133, and may calculate inductance variation $\Delta L$ and quality factor variation $\Delta Q$ of each of the coils 181 to 184.

The controller 160 may calculate a plurality of feature values for detecting a foreign object based on the inductance variation $\Delta L$ and the quality factor variation $\Delta Q$. In this situation, when an object or a foreign object is placed on the charging surface, the feature values may refer to factors that are specially used to detect a foreign object in the embodiment of the present disclosure among the factors that change.

In this situation, the feature values may include average inductance variation $\Delta L/4$, average quality factor variation $\Delta Q/4$, maximum-minimum inductance variation $\Delta Lmax-min$, and maximum-minimum quality factor variation $\Delta Qmax-min$.

The average inductance variation $\Delta L/4$ may be the average of the inductance variations of the coils 181 to 184, and the average quality factor variation $\Delta Q/4$ may be the average of the quality factor variations of the coils 181 to 184.

In addition, the maximum-minimum inductance variation $\Delta Lmax-min$ may be the difference between the maximum inductance variation and the minimum inductance variation among the coils 181 to 184, and the maximum-minimum quality factor variation $\Delta Qmax-min$ may be the difference between the maximum quality factor variation and the minimum quality factor variation among the coils 181 to 184.

Since the wireless power transmission apparatus 100 of the present disclosure uses the average variation and the maximum-minimum variation, rather than using a ratio of the inductance variation or a ratio of the quality factor variation, the foreign object calculation process is simple, and the detection of a foreign object is rapidly realized.

Subsequently, the controller 160 of the wireless power transmission apparatus 100 may determine whether a foreign object is present on the charging surface based on whether the combination of feature values selected from the plurality of feature values falls within a reference region on the coordinate plane (S1670).

Specifically, the controller 160 may generate a combination of two feature values selected from the plurality of feature values.

For example, when the feature values may include average inductance variation $\Delta L/4$, average quality factor variation $\Delta Q/4$, maximum-minimum inductance variation $\Delta L\text{max}-\text{min}$, and maximum-minimum quality factor variation $\Delta Q\text{max}-\text{min}$, the controller 160 may generate a first feature value combination of the average inductance variation $\Delta L/4$ and the average quality factor variation $\Delta Q/4$, a second feature value combination of the average inductance variation $\Delta L/4$ and the maximum-minimum quality factor variation $\Delta Q\text{max}-\text{min}$, a third feature value combination of the maximum-minimum inductance variation $\Delta L\text{max}-\text{min}$ and the average quality factor variation $\Delta Q/4$, a fourth feature value combination of the maximum-minimum inductance variation $\Delta L\text{max}-\text{min}$ and the maximum-minimum quality factor variation $\Delta Q\text{max}-\text{min}$, a fifth feature value combination of the average inductance variation $\Delta L/4$ and the maximum-minimum inductance variation $\Delta L\text{max}-\text{min}$, and a sixth feature value combination of the average quality factor variation $\Delta Q/4$ and the maximum-minimum quality factor variation $\Delta Q\text{max}-\text{min}$.

The controller 160 may select a plurality of feature value combinations from among the first to sixth feature value combinations. For example, the controller 160 may select the first feature value combination and the second feature value combination. Alternatively, the controller 160 may select all of the first to sixth feature value combinations.

The controller 160 may determine whether a foreign object is present on the charging surface based on whether the combination of feature values selected from among the plurality of feature values falls within the reference region on the coordinate plane.

When only the wireless power reception apparatus 200 is placed on the charging surface, the reference region may be set based on a region within which each combination of feature values is displayed on the corresponding coordinate plane.

The memory 120 may store a plurality of reference regions corresponding to the respective combinations of feature values.

When the combinations of feature values selected from among the plurality of feature values are displayed on the corresponding coordinate plane, if all of the combinations of feature values fall within the corresponding reference region, the controller 160 may determine that no foreign object is present on the charging surface.

In addition, the controller 160 may start wireless transmission of power to the wireless power reception apparatus 200.

For example, when the controller 160 selects the first to sixth feature value combinations, if all of the first to sixth feature value combinations fall within the corresponding reference regions, the controller 160 may determine that no foreign object is present on the charging surface and may start charging.

When the combinations of feature values selected from among the plurality of feature values are displayed on the corresponding coordinate plane, if any one of the combinations of feature values does not fall within the corresponding reference region, the controller 160 may determine that a foreign object is present on the charging surface.

In addition, the controller 160 may interrupt the wireless transmission of power to the wireless power reception apparatus 200.

For example, when the controller 160 selects the first to sixth feature value combinations, if any one of the first to sixth feature value combinations does not fall within the corresponding reference region, the controller 160 may determine that a foreign object is present on the charging surface and may stop charging.

The controller 160 may continuously detect a foreign object on the charging surface.

Figure 17:
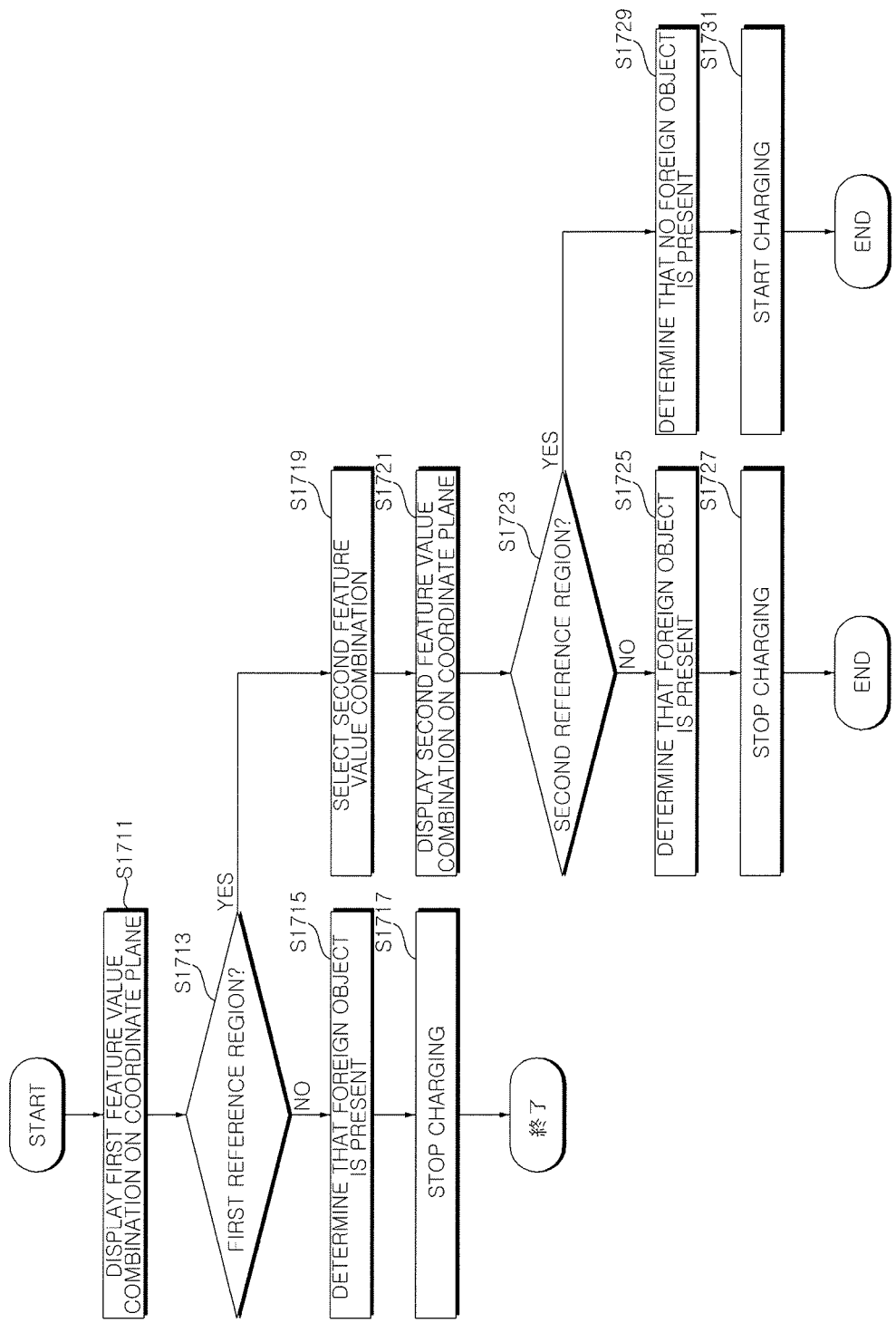
FIG. 17 is a flowchart for explaining a method of detecting a foreign object according to an embodiment of the present disclosure.

FIG. 17 is a flowchart for explaining a method of detecting a foreign object according to an embodiment of the present disclosure.

Referring to the drawing, the wireless power transmission apparatus 100 according to the embodiment of the present disclosure may select the first feature value combination from among the first to sixth feature value combinations.

In this situation, the first feature value combination may be a combination of the average inductance variation $\Delta L/4$ and the average quality factor variation $\Delta Q/4$.

Subsequently, the controller 160 may display the first feature value combination selected from the plurality of feature values on the corresponding coordinate plane (S1711).

The controller 160 may display the average quality factor variation $\Delta Q/4$ relative to the average inductance variation $\Delta L/4$ on the corresponding coordinate plane.

Subsequently, the controller 160 may determine whether the first feature value combination falls within a first reference region (S1713).

In this situation, when only the wireless power reception apparatus 200 is placed on the charging surface, the first reference region may be set based on a region within which the combination of the average inductance variation $\Delta L/4$ and the average quality factor variation $\Delta Q/4$ is distributed on the coordinate plane of the average inductance variation $\Delta L/4$ and the average quality factor variation $\Delta Q/4$. For example, the first reference region may be the region 1070 shown in FIG. 10.

As described above, when only the wireless power reception apparatus 200 is placed on the charging surface, the first reference region is set based on a region within which the combination of the average inductance variation $\Delta L/4$ and the average quality factor variation $\Delta Q/4$ is distributed on the corresponding coordinate plane. Thus, when the first feature value combination does not fall within the first reference region, the controller 160 may determine that a foreign object is present on the charging surface (S1715).

Upon determining that a foreign object is present on the charging surface, the controller 160 may stop charging (S1717). Accordingly, it is possible to protect a user from dangers such as an explosion or a fire.

Meanwhile, in the situation of detecting a foreign object on the charging surface using only the first feature value combination, as shown in FIG. 10, even when a foreign object is present on the charging surface, the controller 160 may determine that no foreign object is present on the charging surface.

Therefore, the controller 160 may continuously determine the presence or absence of a foreign object while changing the feature value combinations.

Specifically, when the first feature value combination falls within the first reference region, the controller 160 may select a second feature value combination (S1719).

The controller 160 may generate the second feature value combination such that at least one of the feature values included in the second feature value combination is different from the feature values included in the first feature value combination.

In this situation, the second feature value combination may be a combination of the average inductance variation $\Delta L/4$ and the maximum-minimum quality factor variation $\Delta Q max-min$.

The controller 160 may display the second feature value combination on the corresponding coordinate plane (S1721).

The controller 160 may display the maximum-minimum quality factor variation $\Delta Q max-min$ relative to the average inductance variation $\Delta L/4$ on the corresponding coordinate plane.

Subsequently, the controller 160 may determine whether the second feature value combination falls within a second reference region (S1723).

In this situation, when only the wireless power reception apparatus 200 is placed on the charging surface, the second reference region may be set based on a region within which the combination of the average inductance variation $\Delta L/4$ and the maximum-minimum quality factor variation $\Delta Q max-min$ is distributed on the coordinate plane of the average inductance variation $\Delta L/4$ and the maximum-minimum quality factor variation $\Delta Q max-min$. For example, the second reference region may be the region 1170 shown in FIG. 11.

When the second feature value combination does not fall within the second reference region, the controller 160 may determine that a foreign object is present on the charging surface (S1725). That is, the controller 160 may detect a foreign object that is not detected by the first feature value combination. Accordingly, there is an effect in that the accuracy of foreign object detection is improved.

Upon determining that a foreign object is present on the charging surface, the controller 160 may stop charging (S1727).

When the second feature value combination falls within the second reference region, the controller 160 may determine that no foreign object is present on the charging surface (S1729).

Upon determining that no foreign object is present on the charging surface, the controller 160 may start charging (S1731).

As such, since the wireless power transmission apparatus 100 uses only the first and second feature value combinations among the first to sixth feature value combinations, it is possible to shorten a time taken to detect a foreign object while increasing the accuracy of foreign object detection.

Meanwhile, the controller 160 of the present disclosure may be implemented as code that can be written on a processor-readable recording medium and thus read by a processor provided in the power transmission apparatus 100. The processor-readable recording medium may be any type of recording device in which data is stored in a processor-readable manner. The processor-readable recording medium may include, for example, ROM, RAM, CD-ROM, magnetic tape, a floppy disk, and an optical data storage device, and may be implemented in the form of a carrier wave transmitted over the Internet. In addition, the processor-readable recording medium may be distributed over computer systems connected via a network such that processor-readable code is written thereto and executed therefrom in a decentralized manner.

As is apparent from the above description, a wireless power transmission apparatus according to the present disclosure calculates a plurality of feature values for detecting a foreign object based on inductance variation and quality factor variation, and determines the presence or absence of a foreign object on a charging surface depending on whether a feature value combination selected from the plurality of feature values falls within a reference region on a corresponding coordinate plane, thereby more accurately detecting a foreign object than a configuration of detecting a foreign object based on only one of inductance variation and quality factor variation.

In the situation of detecting a foreign object using only inductance variation or quality factor variation, the result of detecting a foreign object may be inaccurate due to a change in threshold. However, the wireless power transmission apparatus according to the present disclosure detects a foreign object on a charging surface using a combination of feature values extracted from inductance variation and quality factor variation, for example, average inductance variation, average quality factor variation, maximum-minimum inductance variation, and maximum-minimum quality factor variation, thereby enabling more accurate detection of a foreign object.

In addition, the wireless power transmission apparatus may accurately detect a foreign object regardless of the size of the foreign object, the material of the foreign object (e.g., a magnetic material, a non-magnetic material, etc.), or the like, using a combination of feature values selected from among average inductance variation, average quality factor variation, maximum-minimum inductance variation, and maximum-minimum quality factor variation.

In addition, since the wireless power transmission apparatus includes a plurality of coils disposed to partially overlap each other, a charging area may be expanded, and a foreign object on a charging surface may be easily detected based on average inductance variation, average quality factor variation, maximum-minimum inductance variation, and maximum-minimum quality factor variation of the plurality of transmission coils.

In addition, since the wireless power transmission apparatus is capable of detecting a foreign object through a power transmission coil without a separate circuit or module for detecting a foreign object, a circuit structure is simplified, and manufacturing costs are reduced.

In addition, the wireless power transmission apparatus may detect a foreign object on a charging surface using a combination of feature values and may stop charging upon detecting a foreign object, thereby protecting a user from dangers such as an explosion or a fire.

In addition, the wireless power transmission apparatus charges a wireless power reception apparatus through a combination of coils, rather than through a single coil, thereby shortening a charging time.

In addition, the wireless power transmission apparatus may improve the user's convenience due to reduction in the charging time.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A wireless power transmission apparatus comprising:
a resonant circuit including a plurality of coils and a plurality of capacitor elements respectively connected to the plurality of coils;
a first sensor configured to sense a change in inductance of each of the plurality of coils;
a second sensor configured to sense a change in a quality factor of each of the plurality of coils; and
a controller configured to:
calculate feature values based on an inductance variation and a quality factor variation for detecting a foreign object, and
determine the foreign object is present on a charging surface of the wireless power transmission apparatus based on whether a feature value combination selected from among the feature values falls within a reference region on a coordinate plane formed by an intersection of a first axis and a second axis,
wherein the first axis is based on the inductance variation and the second axis is based on the quality factor variation.

2. The wireless power transmission apparatus according to claim 1, wherein the feature values include an average inductance variation, an average quality factor variation, a maximum-minimum inductance variation, and a maximum-minimum quality factor variation.

3. The wireless power transmission apparatus according to claim 1, wherein the controller is further configured to:
select two feature values from among the feature values, and
generate a combination of the two feature values,
wherein the combination is a point plottable on the coordinate plane.

4. The wireless power transmission apparatus according to claim 1,
wherein the reference region is set based on a region on the coordinate plane including feature value combinations when only a wireless power receiver is placed on the charging surface without any foreign object being present on the charging surface.

5. The wireless power transmission apparatus according to claim 1, further comprising:
a memory configured to store a plurality of reference regions corresponding to respective groupings of feature value combinations,
wherein the controller is further configured to:
generate a plurality of feature value combinations from the feature values, and
determine the foreign object is present on the charging surface based on whether each of the plurality of feature value combinations falls within a corresponding one of the plurality of reference regions.

6. The wireless power transmission apparatus according to claim 1, wherein the controller is further configured to:
plot a first feature value combination selected from among the feature values on the coordinate plane, and
in response to the first feature value combination falling outside of a first reference region, determine that the foreign object is present on the charging surface.

7. The wireless power transmission apparatus according to claim wherein the controller is further configured to:
plot a first feature value combination selected from among the feature values on the coordinate plane,
in response to the first feature value combination failing within a first reference region,
select a second feature value combination from among the feature values, and
determine whether the foreign object is present on the charging surface based on whether the second feature value combination falls within a second reference region.

8. The wireless power transmission apparatus according to claim 7, wherein the controller is further configured to:
in response to the second feature value combination falling outside of the second reference region, determine the foreign object is present on the charging surface.

9. The wireless power transmission apparatus according to claim 8, wherein the second feature value combination includes different feature values than the first feature value combination.

10. The wireless power transmission apparatus according to claim 7, wherein the first feature value combination includes an average inductance variation and an average quality factor variation, and
wherein the second feature value combination includes an average inductance variation and a maximum-minimum quality factor variation.

11. The wireless power transmission apparatus according to claim 1, wherein the controller is further configured to:
plot a plurality of feature value combinations on corresponding coordinate planes, and
in response to each of the plurality of feature value combinations falling within a corresponding predefined reference region, determine that no foreign object is present on the charging surface and start wireless power charging by the wireless power transmission apparatus.

12. The wireless power transmission apparatus according to claim 1, wherein the first sensor is configured to:
calculate a resonant frequency based on a magnitude of voltage acquired from opposite ends of each of the plurality of coils in accordance with sweep of a frequency,
calculate the inductance of each of the plurality coils using the resonant frequency,
sense the change in the inductance of each of the plurality of coils, and
transmit the change in the inductance of each of the plurality of cods to the controller.

13. The wireless power transmission apparatus according to claim 1, wherein the second sensor is configured to:
calculate the quality factor of each of the plurality of coils based on a maximum voltage gain acquired from opposite ends of each of the plurality of coils in accordance with sweep of a frequency,
sense the change in the quality factor of each of the plurality of coils, and
transmit the change in the quality factor of each of the plurality of coils to the controller.

14. The wireless power transmission apparatus according to claim 1, wherein the plurality of coils in the resonant circuit includes first, second, third and fourth coils, and
wherein each coil among the first, second, third and fourth coils partially overlaps with three other coils among the first, second, third and fourth coils.

15. A wireless power transmission method for controlling a wireless power transmission apparatus, the wireless power transmission method comprising:
- sensing a change in inductance of each of a plurality of coils in the wireless power transmission apparatus;
- sensing a change in a quality factor of each of the plurality of coils in the wireless power transmission apparatus;
- calculating feature values based on an inductance variation and a quality factor variation for detecting a foreign object; and
- determining whether the foreign object is present on a charging surface of the wireless power transmission apparatus based on whether a feature value combination selected from among the feature values falls within a reference region on a coordinate plane formed by an intersection of a first axis and a second axis,
- wherein the first axis is based on the inductance variation and the second axis is based on the quality factor variation.

16. The wireless power transmission method according to claim 15, wherein the calculating the feature values includes:
- calculating an average inductance variation;
- calculating an average quality factor variation;
- calculating a maximum-minimum inductance variation; and
- calculating a maximum-minimum quality factor variation.

17. The wireless power transmission method according to claim 15, further comprising:
- plotting a first feature value combination selected from among the feature values on the coordinate plane; and
- in response to the first feature value combination falling outside of a first reference region, determining that the foreign object is present on the charging surface.

18. The wireless power transmission method according to claim 15, further comprising:
- plotting a first feature value combination selected from among the feature values on the coordinate plane;
- in response to the first feature value combination falling within a first reference region,
- selecting a second feature value combination from among the feature values; and
- determining whether the foreign object is present on the charging surface based on whether the second feature value combination falls within a second reference region.

19. The wireless power transmission method according to claim 18, wherein the second feature value combination includes different feature values than the first feature value combination.

20. The wireless power transmission method according to claim 15, further comprising:
- plotting a plurality of feature value combinations selected from among the feature values on corresponding coordinate planes; and
- in response to each of the plurality of feature value combinations falling within a corresponding predefined reference region, determining that no foreign object is present on the charging surface and starting wireless power charging by the wireless power transmission apparatus.

* * * * *